US011022575B1

(12) United States Patent
Eakins et al.

(10) Patent No.: US 11,022,575 B1
(45) Date of Patent: Jun. 1, 2021

(54) SYSTEMS AND METHODS FOR MEASURING UNIQUE MICROELECTRONIC ELECTROMAGNETIC SIGNATURES

(71) Applicant: Applied Research Associates, Inc., Albuquerque, NM (US)

(72) Inventors: Christian Eakins, Columbus, OH (US); Thomas Kent, Columbus, OH (US)

(73) Assignee: Applied Research Associates, Inc., Albuquerque, NM (US)

( * ) Notice: Subject to any disclaimer, the term of this patent is extended or adjusted under 35 U.S.C. 154(b) by 389 days.

(21) Appl. No.: 15/957,712

(22) Filed: Apr. 19, 2018

Related U.S. Application Data

(60) Provisional application No. 62/513,582, filed on Jun. 1, 2017, provisional application No. 62/641,716, filed on Mar. 12, 2018.

(51) Int. Cl.
*G01N 27/02* (2006.01)
*G06N 7/00* (2006.01)

(52) U.S. Cl.
CPC .......... *G01N 27/026* (2013.01); *G06N 7/005* (2013.01)

(58) Field of Classification Search
CPC ....... G06F 21/44; G01N 27/026; G06N 7/005
See application file for complete search history.

(56) References Cited

U.S. PATENT DOCUMENTS

| 10,145,930 B1* | 12/2018 | Betts | G01R 27/32 |
| 2012/0226463 A1 | 9/2012 | Keller, III | |
| 2017/0289786 A1* | 10/2017 | Dishon | H04K 3/822 |
| 2018/0268172 A1* | 9/2018 | Koziel | G06F 21/44 |

OTHER PUBLICATIONS

The Committee's Investigation Into Counterfeit Electronic Parts in the Department of Defense Supply Chain, Hearing before the Committee on Armed Services, United States Senate, 112th Congress, First Session, Nov. 8, 2011 (215 pages total).
Christian Eakins et al., "Assessment of Required Minimum Sample Size in Variation Signature Based Approaches to Device Authentication", Reno, NV: GOMACTech, Mar. 19, 2017 (6 pages total).
William R. Dillon et al., Multivariate analysis: methods and applications, Chapter 2: Principal Components Analysis, New York: Wiley, 1984. Print (pp. 23-52).

(Continued)

*Primary Examiner* — Kyle R Quigley
(74) *Attorney, Agent, or Firm* — Dinsmore & Shohl LLP; Monika Jaensson, Esq.; Bryan Walker, Esq.

(57) ABSTRACT

Systems and methods for measuring unique microelectronic electromagnetic signatures are provided. A method includes injecting a nondestructive signal as input into a port of an object. The method may further include receiving as output from a signal path within the object a unique frequency dependent complex spectrum comprising a reflection spectrum or a transmission spectrum. The method may also include generating a unique object signature based upon the port and the received spectrum. The method may still further include differentiating the object from a different object based upon a comparison of the unique object signature of each.

19 Claims, 18 Drawing Sheets
(16 of 18 Drawing Sheet(s) Filed in Color)

(56) References Cited

OTHER PUBLICATIONS

Christian Eakins et al., "Fidelity Assessment of Signature Measurement Techniques for Second-Order Effect Based Integrated Circuit Authenticity Determination", Reno, NV: GOMACTech, Mar. 19, 2017 (4 pages total).

Thomas Kent, PhD, Trusted & Assured Microelectronics Workshop Applied Research Associates/BerrieHill Division, Aug. 30, 2017, www.ara.com (11 pages total).

* cited by examiner

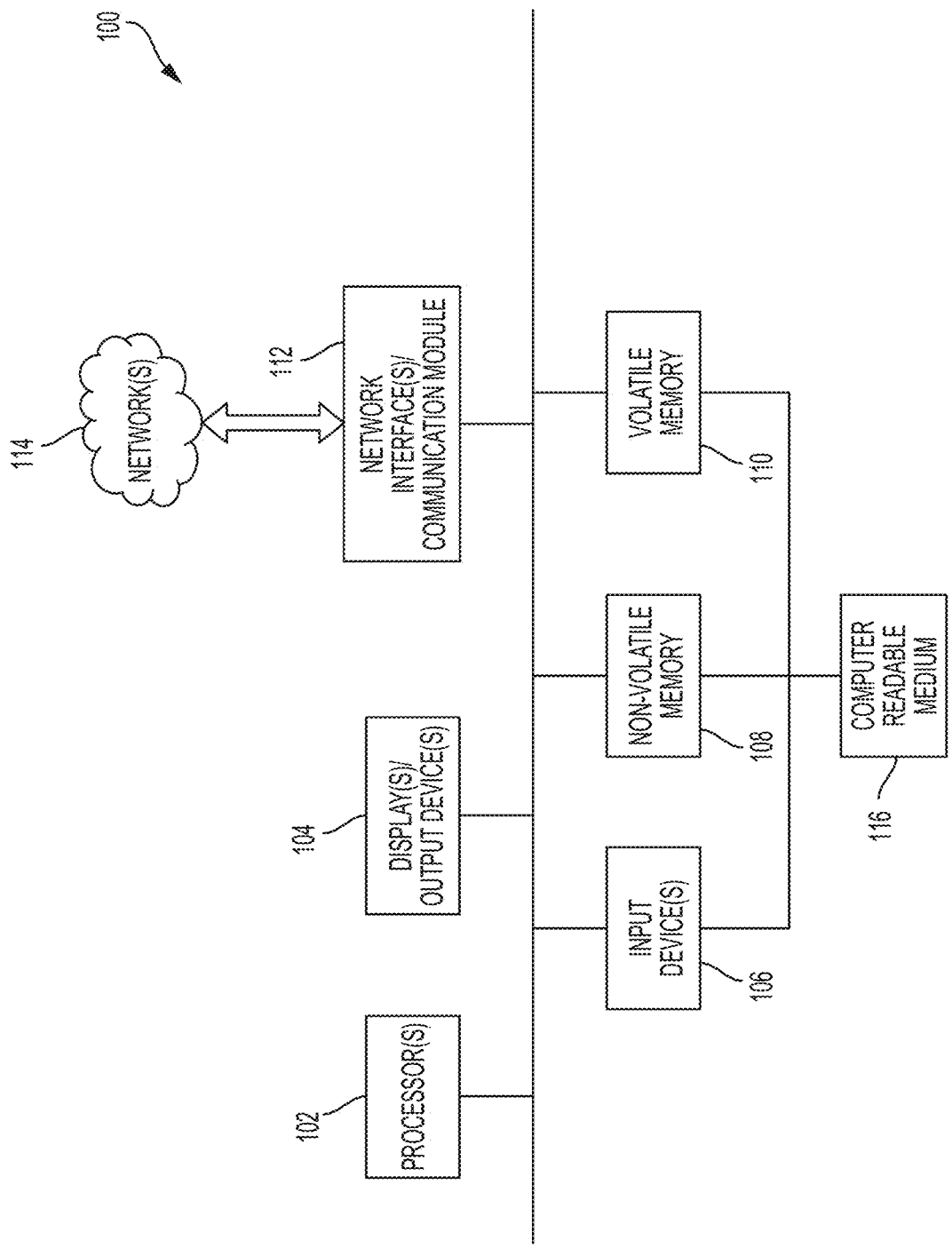

SYSTEMS AND METHODS FOR MEASURING UNIQUE MICROELECTRONIC ELECTROMAGNETIC SIGNATURES

CROSS-REFERENCE TO RELATED APPLICATIONS

This application claims the benefit of U.S. Provisional Application 62/513,582, filed Jun. 1, 2017, and U.S. Provisional Application 62/641,716, filed Mar. 12, 2018, both of which are incorporated by reference in their entirety.

TECHNICAL FIELD

The present application generally relates to device signature generation and comparison, such as passive RF injection spectrometry.

BACKGROUND

Counterfeit electronic material poses a significant risk toward the long term reliability and security of military weapons systems and civilian infrastructure. Due to the mismatch in lifecycles for high reliability systems and commercial off-the-shelf microelectronics, procurement of new old stock replacement components required for regular system maintenance has become challenging due to dwindling domestic stock levels. To fill that market niche, an increasingly sophisticated offshore supplier network has developed which produces counterfeit devices marked as new old stock to be sold for use by military equipment manufacturers. At the same time, the level of sophistication employed by counterfeiters has expanded considerably.

By theft of intellectual property and/or or systematic reverse engineering, counterfeiters have begun to create reproductions of legacy devices which mimic their functionality, yet are actually new devices created in a 3rd party fabricator. These advanced counterfeit devices pose a significant risk to the high reliability supply chain from multiple vectors. Semi-compromised IP used to clone a device can lead to electrical reliability issues with counterfeit devices or behavior that was not a design consideration of the original manufacturer. More worrisome, however, is that since these devices are reproduced from the silicon wafer and wind up using either directly cloned mask sets or sophisticated functional reverse engineering, they offer an attractive vector for inserting non-native functionality into a device's design (e.g., trojan malware, kill switch, etc.).

Accordingly, a need exists for systems that can utilize measurement techniques for characterizing unique microelectronic electromagnetic signatures, along with methods of use of such systems.

SUMMARY

A system for measuring unique microelectronic electromagnetic signatures may comprise a measurement component configured to inject a nondestructive signal as input into a port of an object. The synchronizing sensor may be further configured to receive as output from a signal path within the object a unique frequency dependent complex spectrum comprising a reflection spectrum or a transmission spectrum. The system may further comprise an analysis component configured to generate a unique object signature based upon the port and the received spectrum. The analysis component may be further configured to differentiate the object from a different object based upon a comparison of the unique object signature of each.

In another embodiment, a method for measuring unique microelectronic electromagnetic signatures may include injecting a nondestructive signal as input into a port of an object. The method may further include receiving as output from a signal path within the object a unique frequency dependent complex spectrum comprising a reflection spectrum or a transmission spectrum. The method may also include generating a unique object signature based upon the port and the received spectrum. The method may still further include differentiating the object from a different object based upon a comparison of the unique object signature of each.

These and additional features provided by the embodiments described herein will be more fully understood in view of the following detailed description, in conjunction with the drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 is a block diagram illustrating computing hardware utilized in one or more devices for implementing various processes, media, and systems, according one or more embodiments shown and described herein;

DETAILED DESCRIPTION

Figure 2A:
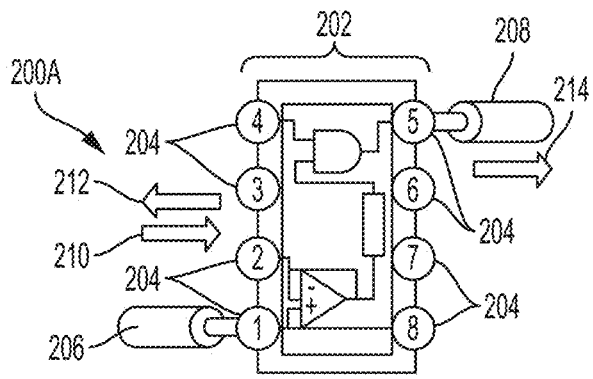
FIG. 2A schematically illustrates pin-level RF transmission and reflection spectrometry in a circuit, according to one or more embodiments shown and described herein.

Embodiments of the present disclosure are directed to methods and systems for measuring unique microelectronic electromagnetic signatures. Obtaining a unique device signature may provide sensitivity to the internal structure and materials of microelectronic packages, dies and devices across all industries. As discussed in more detail below, embodiments may utilize a multiport vector network analyzer (VNA) or a plurality of VNAs.

Referring now to FIG. 1, a block diagram illustrates an example of a computing device 100, through which embodiments of the disclosure can be implemented. The computing device 100 described herein is but one example of a suitable computing device and does not suggest any limitation on the scope of any embodiments presented. Nothing illustrated or described with respect to the computing device 100 should be interpreted as being required or as creating any type of dependency with respect to any element or plurality of elements. In various embodiments, a computing device 100 may include, but need not be limited to, a desktop, laptop, server, client, tablet, smartphone, or any other type of device that can compress data. In an embodiment, the computing device 100 includes at least one processor 102 and memory (non-volatile memory 108 and/or volatile memory 110). The computing device 100 can include one or more displays and/or output devices 104 such as monitors, speakers, headphones, projectors, wearable-displays, holographic displays, and/or printers, for example. The computing device 100 may further include one or more input devices 106 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 100 may include non-volatile memory 108 (ROM, flash memory, etc.), volatile memory 110 (RAM, etc.), or a combination thereof. A network interface 112 can facilitate communications over a network 114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 112 can be communicatively coupled to any device capable of transmitting and/or receiving data via the network 114. Accordingly, the hardware of the network interface 112 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 116 may comprise a plurality of computer readable mediums, each of which may be either a computer readable storage medium or a computer readable signal medium. A computer readable storage medium 116 may reside, for example, within an input device 106, non-volatile memory 108, volatile memory 110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 100 may include one or more network interfaces 112 to facilitate communication with one or more remote devices, which may include, for example, client and/or server devices. A network interface 112 may also be described as a communications module, as these terms may be used interchangeably.

Turning now to FIG. 2A, a schematic illustration 200A depicts RF transmission and reflection spectrometry at pin-level in an object, such as a circuit, as a means to generate unique device signatures is shown according to various embodiments. An object 202 may comprise one or more object ports 204 through which signals may enter (such as by signal injection) and/or exit the object. Any suitable number object ports 204 may be utilized in various embodiments. An object 202 may include any type of object capable of conducting/transmitting a signal, such as electronic/electric signals, audio signals, optical signals (visible light, infrared, etc.), chemical signals, etc. An object 202 may include any type circuit (analog, digital, mixed-signal, chemical, biological, cellular, microbiological, etc.), subcircuit or subsystem, biological object, cellular object, microbiological object, or any other type of object through which a signal may be transmitted, input, and/or output. Object ports 204 may include any suitable type(s) of connection mechanism, such as pins, and may be made of suitable material capable of providing transmission of a signal. Object ports 204 may differ from each other despite being associated with the same object 202.

One or more signal injectors 206 may inject a signal into one or more object ports 204, with one or more signal receivers 208 being used to measure the signal. In various embodiments a signal injector 206 and/or signal receiver 208 may be any suitable type of device or other mechanism for generating/delivering/propagating and/or measuring/quantifying/receiving one or more types of signals. In one example a signal may be a radio frequency (RF) signal, such that passive RF injection spectrometry may be utilized as a measurement technique for characterizing unique microelectronic electromagnetic signatures. In some embodiments a device may function as both a signal injector 206 and a signal receiver 208. A signal forming an injected wave 210 may be measured at the point of injection (i.e., the object port 204 where the signal is injected into the object 202) such that a reflected wave 212 and/or frequency may be measured. In this embodiment a reflected wave 212 may constitute a measure of how far the signal goes into the object 202. In some embodiments a reflection path is unique in that the incident signal penetrates into the object (such as a circuit) up to a point, encompassing some or all of the full transmission path in some instances.

A signal forming an injected wave 210 may also be measured at object ports 204 other than at the point of injection, such that a transmitted wave 214 may be measured. In some embodiments, reflected wave 212 and/or transmitted wave 214 measurements may be due to input impedance of object nodes 204 (such as external circuit nodes) and/or objects 202. In this embodiment, for example, simple single pin reflection and/or transmission measurements may be utilized to show characteristic differences in reflection/transmission spectra between objects 202 having identical packages but differing circuitry, and a combinatorial implementation may be utilized to yield higher signature fidelity.

A reflected wave 212 and/or transmitted wave 214 may be defined in some embodiments as a measure of the response that an object 202 (for example a circuit) presents to a current when a signal (such as a voltage) is applied. At higher frequencies, this may qualitatively describe how efficiently injected energy couples into an object 202. In some embodiments, due to complex mutual coupling effects present at higher frequencies (by way of non-limiting example, those in excess of 1 MHz), impedance may become a dynamic function of frequency and path within an object 202 (such as a circuit). Thus in some embodiments this may lead to a unique frequency dependent upon reflection and/or transmission spectra for a particular electromagnetic wave path within an object 202. In this embodiment a unique identifying signature of an object may be generated based upon a combination of the object port(s) involved and the reflection/transmission frequency/wave.

In various embodiments an object 202 need not be to be operated/powered on/up to be tested (e.g., receive a signal injection). In some embodiments signal injection is nondestructive (e.g., a small <1 mW RF signal injection by way of non-limiting example), such that the object 202 may be in a powered-off state during injection of the nondestructive signal. In embodiments there may be a physical link between variation sources and real-space circuit locations and electromagnetic frequencies. Measurements in various embodiments may be rapidly conducted (2 minutes, 4 seconds, 1 second, or any other feasible uniform/non-uniform amount of time per object).

Figure 2B:
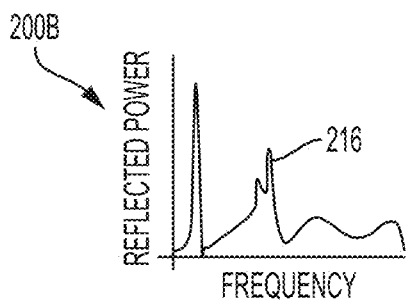
FIG. 2B illustrates a graph of reflection spectrometry, according to one or more embodiments shown and described herein.

Turning now to FIG. 2B, a graph 200B depicting reflection spectrometry is shown according to various embodiments. The reflected wave graph 216 in this embodiment depicts the reflection spectrometry of the object 202 depicted in FIG. 2A.

Figure 2C:
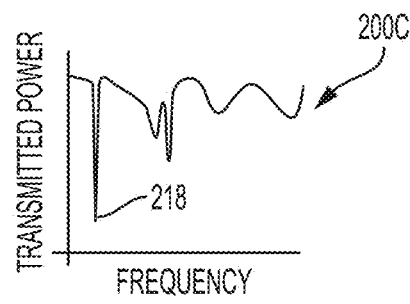
FIG. 2C illustrates a graph of transmission spectrometry, according to one or more embodiments shown and described herein.

Turning now to FIG. 2C, a graph 200C depicting transmission spectrometry is shown according to various embodiments. The transmitted wave graph 218 in this embodiment depicts the transmission spectrometry of the object 202 depicted in FIG. 2A.

Figure 3A:
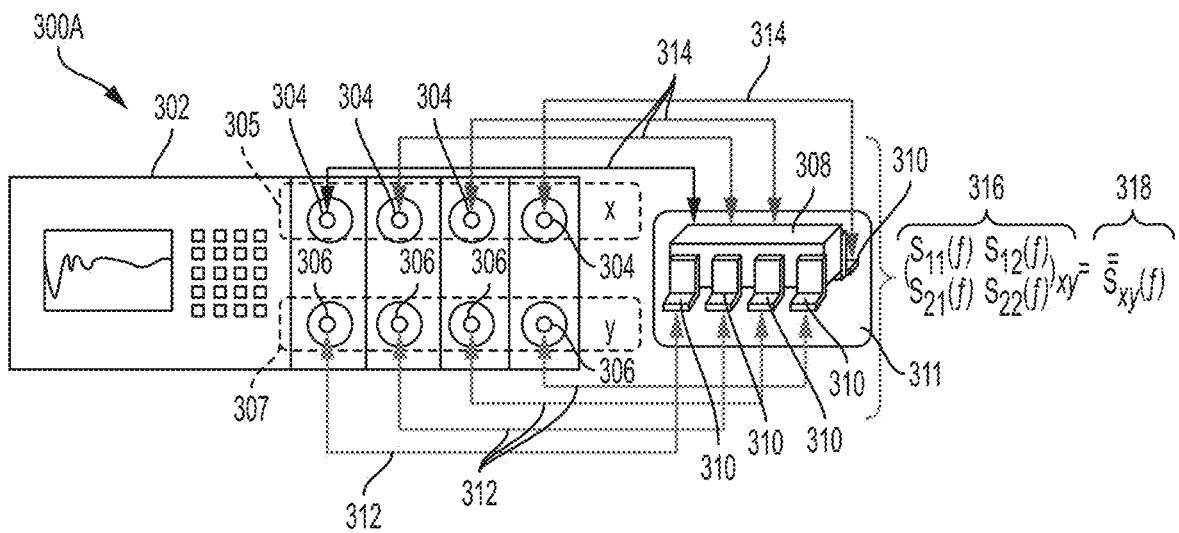
FIG. 3A is a block diagram that illustrates a multiport vector network analyzer implementation, according to one or more embodiments shown and described herein.

Turning now to FIG. 3A, a schematic illustration 300A depicting a VNA implementation is shown according to various embodiments. The embodiment depicted utilizes multiple linked VNAs within, for example, a multiport VNA chassis 302. In this non-limiting example a first multiport VNA 305 has multiple first multiport VNA ports 304 and a second multiport VNA 307 has multiple second multiport VNA ports 306. In other embodiments any number of VNA's and/or VNA ports may be utilized. In this embodiment transmission and reflection spectra may be probed using VNAs capable of producing frequency-dependent, complex (magnitude and phase) transmission spectra. By way of non-limiting example, a multiport VNA such as a multiport VNA chassis 302 with multiple VNAs 305, 307 may be directly connected to a signal injection board 311 associated with a subject object 308, eliminating the need for a switch matrix at each port. In this embodiment signal injection may be performed without a switch matrix, by using multiple VNAs 305, 307, although a multiport VNA may be utilized in other embodiments. In this embodiment first multiport VNA ports 304 are connected to first object testing communication mechanisms 314, and second multiport VNA ports 306 are connected to second object testing communication mechanisms 312.

The multiport configuration depicted in FIG. 3A may be utilized to speed up measurement times while reducing losses due to the fact that no external switches are needed to collect all possible port combinations. Put another way, this embodiment utilizes a multi-port VNA system constructed from VNA subsystems which may eliminate switch matrices and thereby reduce measurement time (<4 seconds/device by way of non-limiting example). In some embodiments a plurality of objects may be tested to generate a unique object signature for each object, where each test of each object in the plurality of objects may be completed in less than 4 seconds. This embodiment may utilize a multiport VNA chassis 302 system, which may (by way of non-limiting example) be based on the PXI (PCI extensions for instrumentation) platform. A multiport VNA may be utilized to allow for scattering parameters to be collected between any (for example) two ports of an object. Moreover, a multiport VNA may allow scattering parameter(s) to be collected between any two ports in this embodiment where such a multiport configuration may speed up measurement times while reducing losses due to the fact that no external switches are needed to collect all possible port combinations. Frequency dependent complex S-parameters 316 may be utilized to determine a matrix 318 Sij(f), where x, y denote integrated circuit (IC) pins connected to ports 1 and 2 of a VNA. In some embodiments Sij may be utilized to represent general S-parameter 316 measurements, where i and j may be 1 to n, where n may correspond to the number of VNA ports.

Figure 3B:
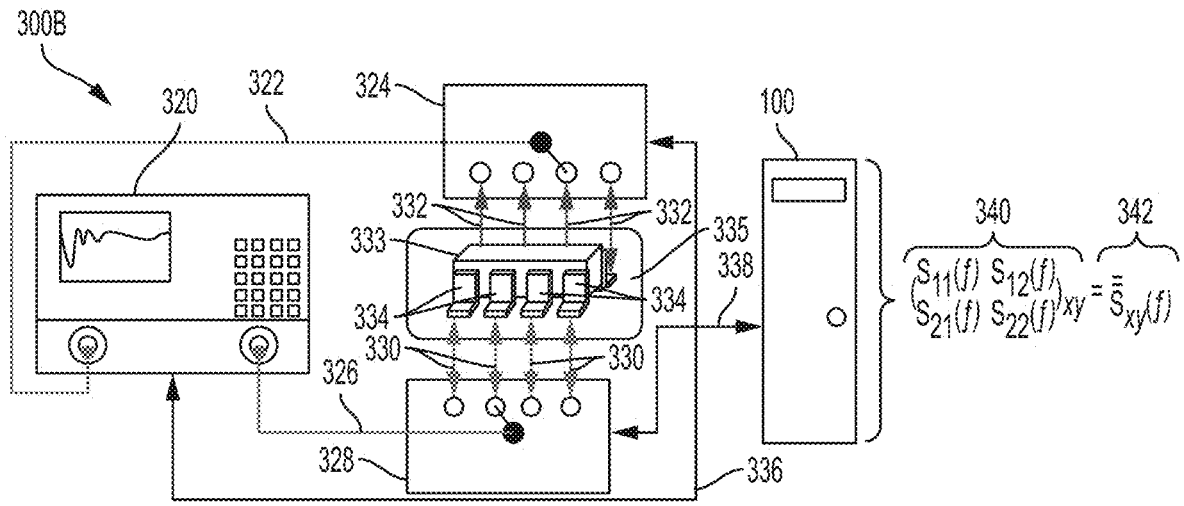
FIG. 3B is a block diagram that illustrates a vector network analyzer with switch matrices, according to one or more embodiments shown and described herein.

Turning now to FIG. 3B, a schematic illustration 300B depicting a VNA 320 with a first switch matrix 324 and a second switch matrix 328 is shown according to various embodiments. Some embodiments may utilize one or more solid state switch matrices. A signal injection system (having a volume in this embodiment 1'×2'×6" by way of non-limiting example) which may utilize a VNA and a suite of measurement control and/or analysis software. In this embodiment, an object 333 under test may be loaded by an operator (person, machine, etc.) and signature collection may take, by way of non-limiting example, approximately 2 minutes per object 202, or any other feasible amount of time. The measurement time may be based for example on the scan time of the VNA, switching time of a switch matrix, and sample loading by an operator.

An impedance spectra may generally be different looking into each object port and signal path through an object. This embodiment depicts a first switch matrix 324 and a second switch matrix 328 on each side of the dual in-line package. Utilize a suitable number and/or configuration of switch matrices may allow for the collection of a full combinatorial scattering parameter dataset which describes the frequency dependent transmission and reflection spectra for each possible signal path within a given object, such as an integrated circuit. Signal paths often may not be intentional to the design of the object and may be based on a parasitic coupling effect as frequencies increase, which may make the measurement uniquely capable of sensing changes in the object's internal structure, composition and non-idealities thereof. Continuing with this embodiment, the VNA 320 is connected to the first switch matrix 324 by a first VNA communication mechanism 322 and to the second switch matrix 328 by a second object testing communication mechanism 326. A second object testing communication mechanism 330 may be connected to subject object pins 334 of the subject object 333 connected with a signal injection board 335. A switch matrix return communication mechanism 336 may connect the first switch matrix 324 to the VNA 320. A computer communication mechanism 338 may connect the second switch matrix 328 to a computer 100, which may be utilized for data acquisition. The computer 100 may further be utilized in some embodiments for calculating frequency dependent complex S-parameters 340 to determine a matrix 342 Sij(f), where x, y may denote IC pins connected to ports 1 and 2 of a VNA. In some embodiments the integrated computer of the VNA 320 may be utilized as a measurement controller to control one or more components depicted in FIG. 3B.

Figure 4A:
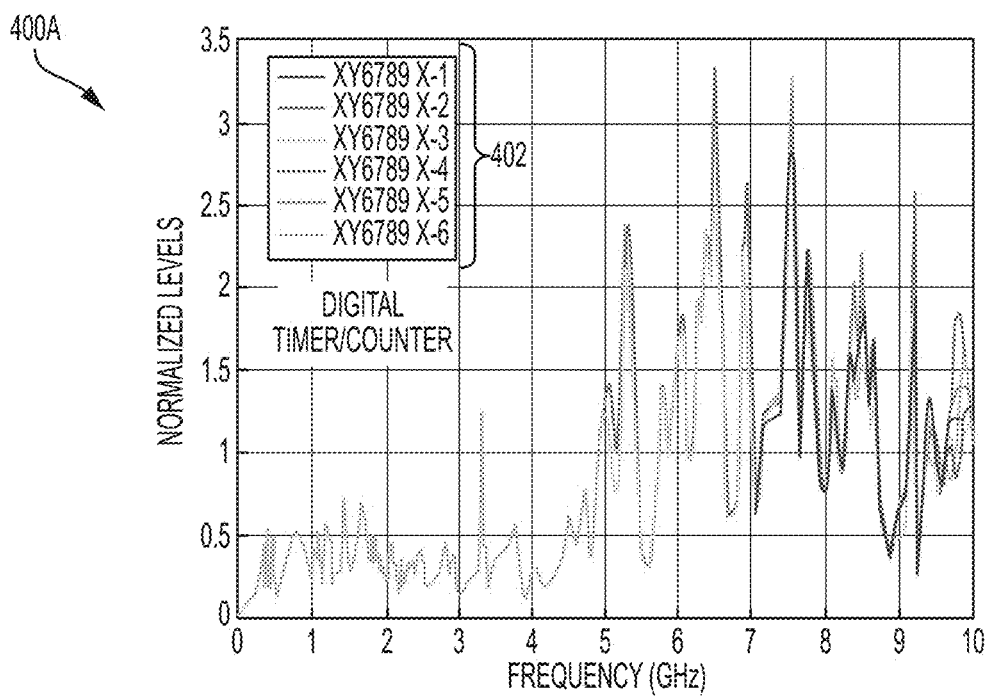
FIG. 4A illustrates a graph depicting reflection spectrum for a digital chip, according to one or more embodiments shown and described herein.

Turning now to FIG. 4A, a graph 400A depicting reflection spectrum for a digital chip is shown according to various embodiments. The digital chip reflection spectrum graph 402 in this example depicts a demonstration of the distinct structure of spectra generated during measurements for a digital timer/counter IC. The difference in peak amplitude and location is depicted and the data shown here are for replicate measurements of multiple individual objects of the same object number, which may show reproducibility between measurements. The impedance spectra may appear different based upon the object port and signal path through an object.

Figure 4B:
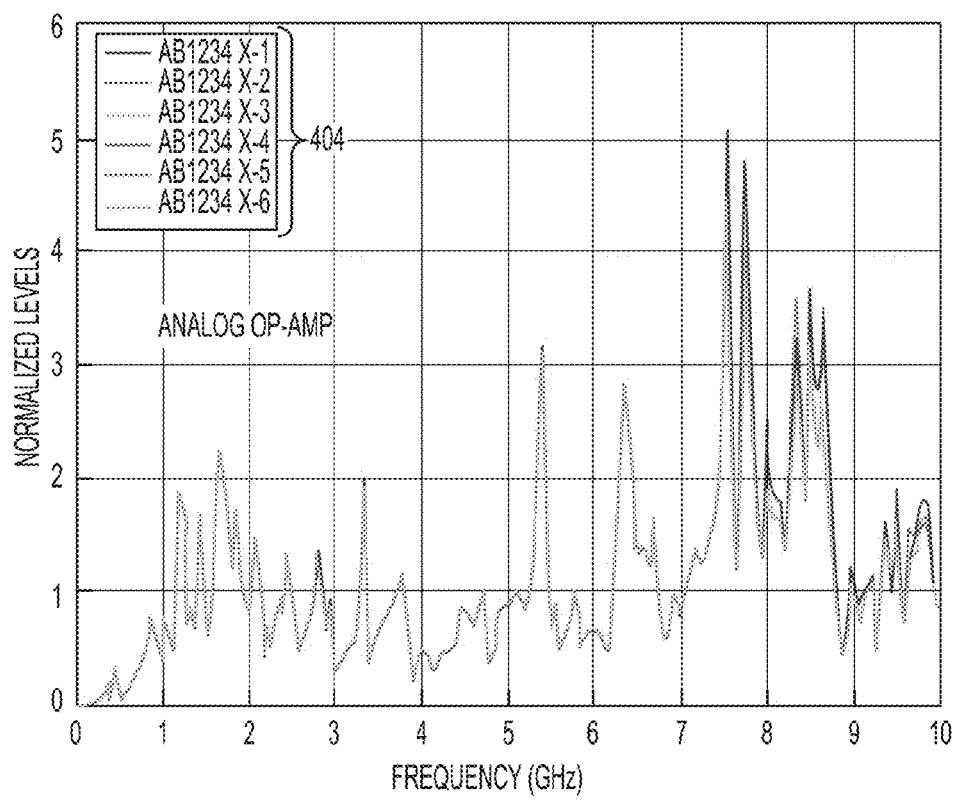
FIG. 4B illustrates a graph depicting reflection spectrum for an analog chip, according to one or more embodiments shown and described herein.

Turning now to FIG. 4B, a graph 400B depicting reflection spectrum for an analog chip is shown according to various embodiments. The analog chip reflection spectrum graph 404 in this embodiment depicts a demonstration of the distinct structure of spectra generated during measurements for an analog op-amp may produce distinct, repeatable scattering parameter spectra that can be detected between objects, as discernible in the objects depicted in FIGS. 4A and 4B. Thus, by way of non-limiting example, frequency dependent reflection spectra collected from a single set of pin configurations for a digital object (FIG. 4A) and an analog object (FIG. 4B) may provide unique spectral features for each of the objects and/or measurement repeatability.

Figure 5:
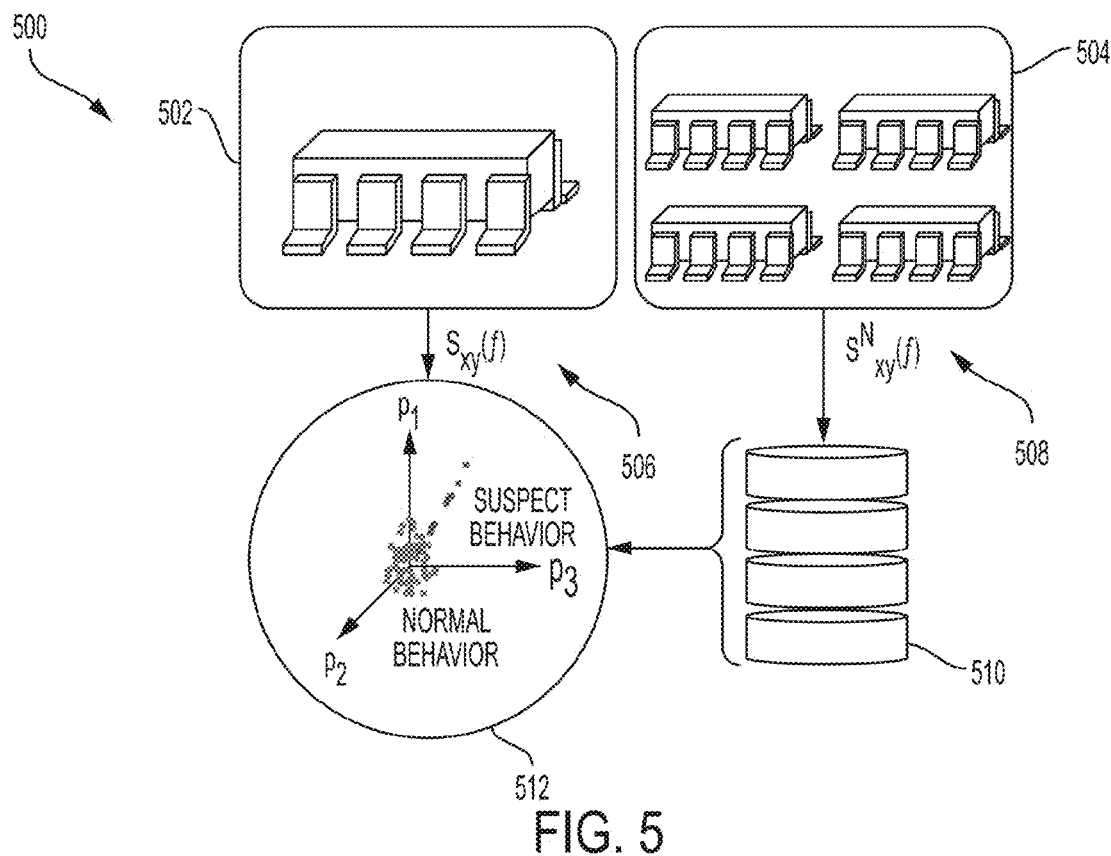
FIG. 5 schematically illustrates statistical analysis utilizing a behavioral database for a suspect object and known authentic objects, according to one or more embodiments shown and described herein.

Turning now to FIG. 5, a schematic illustration 500 depicting statistical analysis utilizing a behavioral database for a suspect object 502 and known authentic objects 504 is shown according to various embodiments. In this embodiment, FIG. 5 depicts a known object matrix 508 and a signature library or behavioral database 510 utilizing a subject object matrix 506 based on data by application of dimensionality reduction techniques. An exemplary dataset may contain, by way of non-limiting example, four frequency dependent complex S-parameters for each switch matrix configuration, leading to datasets which contain from many tens of thousands to a few million observable variables. To generate and parse unique device signatures from the rich dataset, dimensionality reduction may be utilized in the form of principal component analysis (PCA). This technique may construct an orthogonal basis which maximizes the total variance in a dataset based on a weighted linear combination of observation variables. In this case the variables may be contents of the Sij(f) matrix, where x, y denote the IC pins connected to ports 1 and 2 of a VNA.

In this embodiment, by way of non-limiting example, when a dataset consisting of similar objects (e.g., known authentic objects 504) and an unknown or suspect object 502 may be input into the PCA algorithm, such that the similar objects will form a cluster, with an unknown object appearing at a point some distance away from the centroid or the outer bounds of the cluster. In this way, metrics such as distance from centroid, distance from cluster bounds, etc. may be established for pass/fail criteria for counterfeit detection. These metrics may be established and checked automatically using machine learning algorithms against the behavioral database 510 which, by way of non-limiting example, may be constructed from measurements taken in a production line from a trusted manufacturer. A measured behavior three dimensional graph 512 may be utilized to show points, such that normal behavior points can be visually distinguished from suspect behavior points. Other embodiments may utilize other ways to perform data reduction or clustering.

Figure 6:
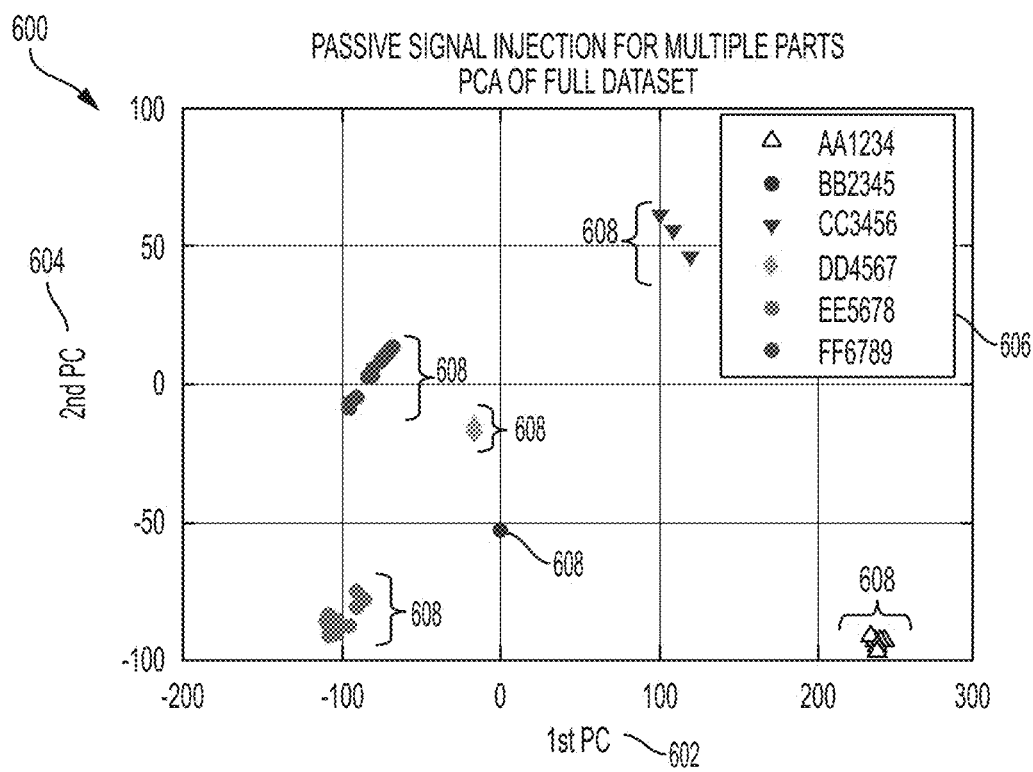
FIG. 6 illustrates a graph displaying passive signal injection for multiple objects, according to one or more embodiments shown and described herein.

Turning now to FIG. 6, a graph 600 displaying passive signal injection for multiple objects is shown according to various embodiments. In this embodiment PCA analysis, having a first principal component 602 and a second principal component 604, may be utilized for a dataset containing multiple individuals of a number of object families, to demonstrate reproducible differentiation between the objects in the object list 606 as data points 608 on the graph 600.

FIG. 6 depicts a non-limiting exemplary demonstration of the technique of generating unique device signatures, where a dataset was previously collected consisting of a number of object numbers and individuals between each object. These objects may have varying degrees of similarity of their internal structure and function (digital, analog, etc.). All objects 202 in this example have the same DIP-8 package to eliminate packaging effects from this comparison. This example reproducibly distinguishes between the clusters in PCA space corresponding to each object. In some embodiments these data may be utilized for counterfeit detection, sensitivity to dormant, and/or legacy or obfuscated internal circuitry, by way of non-limiting examples. Another non-limiting example may involve performing, based upon unique object signatures, differentiation between objects on the basis of manufacturer, date code, usage wear, wafer, packing house, fabrication location, age, environmental effects, manufacturer effects, etc.

Figure 7A:
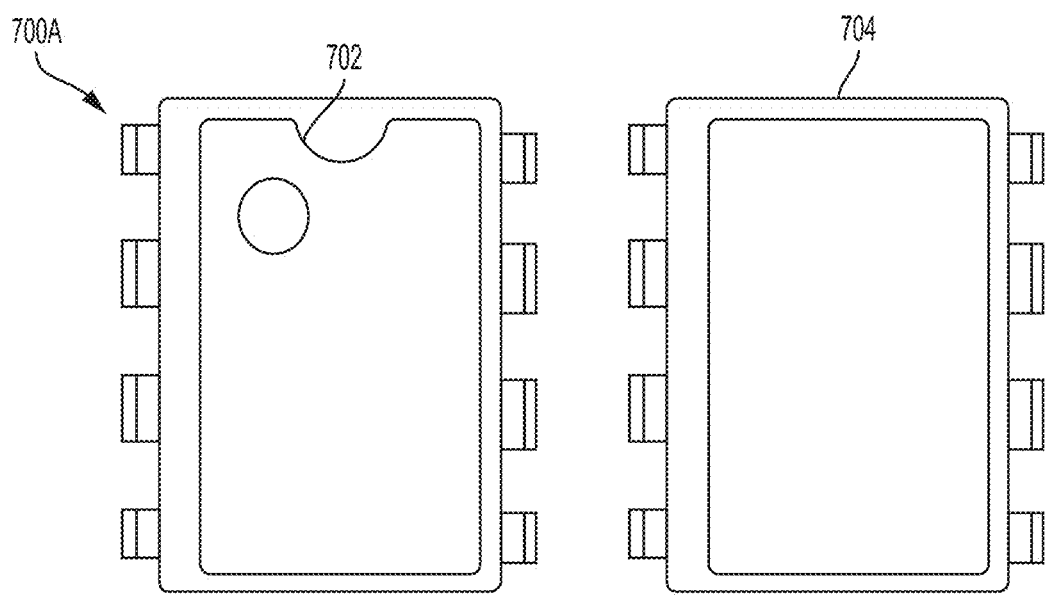
FIG. 7A schematically illustrates a new chip and a replacement chip, according to one or more embodiments shown and described herein.

Turning now to FIG. 7A, a schematic illustration 700A depicting a replacement chip 702 and a new chip 704 is shown according to various embodiments.

Figure 7B:
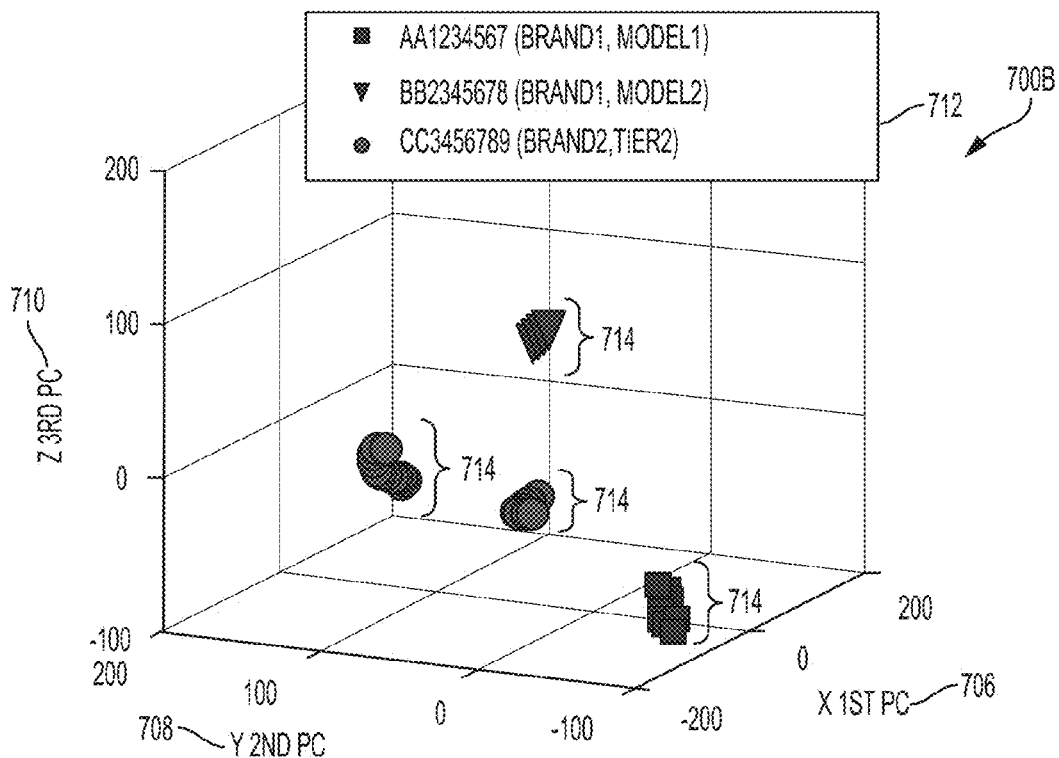
FIG. 7B illustrates a three dimensional graph displaying the principal component analysis of the new chip and the replacement chip, according to one or more embodiments shown and described herein.

Turning now to FIG. 7B, a three dimensional graph 700B displaying the principal component analysis of the new chip and the replacement chip is shown according to various embodiments. In this embodiment PCA analysis utilizes a first principal component 706, a second principal component 708, and a third principal component 710. PCA may be performed upon a dataset containing multiple individuals of the same object number (identical datasheets) from two different vendors, and may be utilized to demonstrate reproducible differentiation between objects from disparate vendors, as shown in the legend 712. A successful identification may reproducibly generate distinct signatures for the brand2 (red) and brand1 (blue) objects, and further show that the brand2 objects are actually an agglomeration of two subsets of objects (for example, two manufacturers and/or date codes which were relabeled). These signature data points 714 may be utilized to show that even minor differences in dies, packaging, etc. are discernable.

Figure 8A:
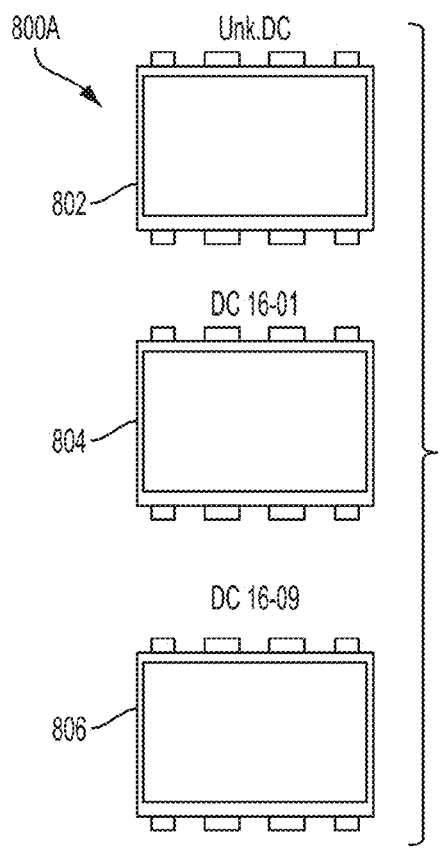
FIG. 8A schematically illustrates three chips having different date codes, according to one or more embodiments shown and described herein.

Turning now to FIG. 8A, a schematic illustration 800A depicts three chips originating from a specific semiconductor manufacturer and being a same model, but having different date codes, is shown according to various embodiments. With respect to a first date code chip 802, a second date code chip 804, and a third date code chip 806, the system of the disclosed technology may reproducibly discern between date/lot codes of objects.

Figure 8B:
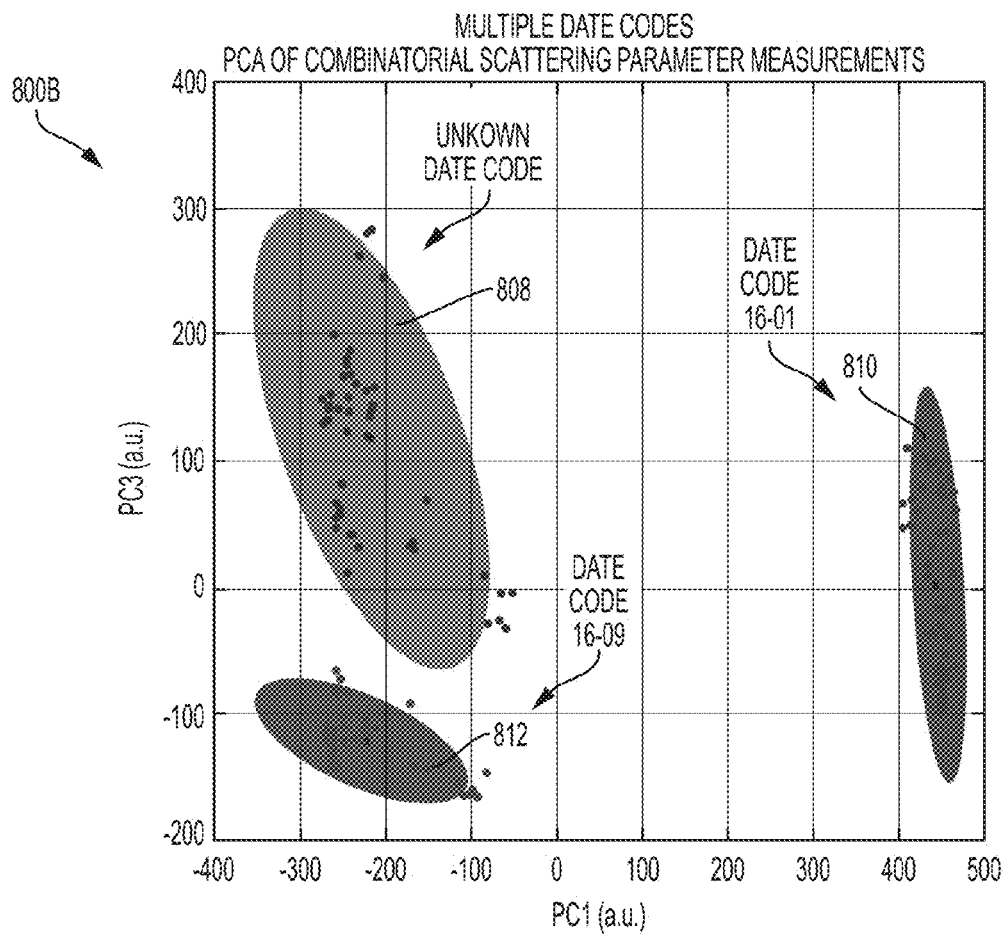
FIG. 8B illustrates a graph displaying the principal component analysis of combinatorial scattering parameter measurements of the three chips with different date codes, according to one or more embodiments shown and described herein.

Turning now to FIG. 8B, a graph 800B displaying the principal component analysis of combinatorial scattering parameter measurements of the three chips with different date codes is shown according to various embodiments. In this embodiment PCA analysis of a dataset containing three sets of individuals of the same object number, manufacturer, but different date codes may be utilized to demonstrate reproducible differentiation between the date codes.

In this non-limiting example, a dataset of signatures may be measured for three families of ICs, with two of distinct date codes procured from a first supplier and another of unknown date code procured from a second supplier. A PCA plot of the processed signature dataset with inertia ellipsoids constructed about the clusters in this example is shown in FIG. 8B utilizing unknown date code chip data points 808 (where the chips would not necessarily involve one single date code), the first date code chip data points 810, and the second date code chip data points 812. These data may be utilized to show reproducible date-code based differentiation without prior knowledge about a chip's datasheet, pinout, with the testing being completely passive and using very small injected signals (for example, <1 mW) to generate signature data and are compatible with production line level throughput.

Figure 9:
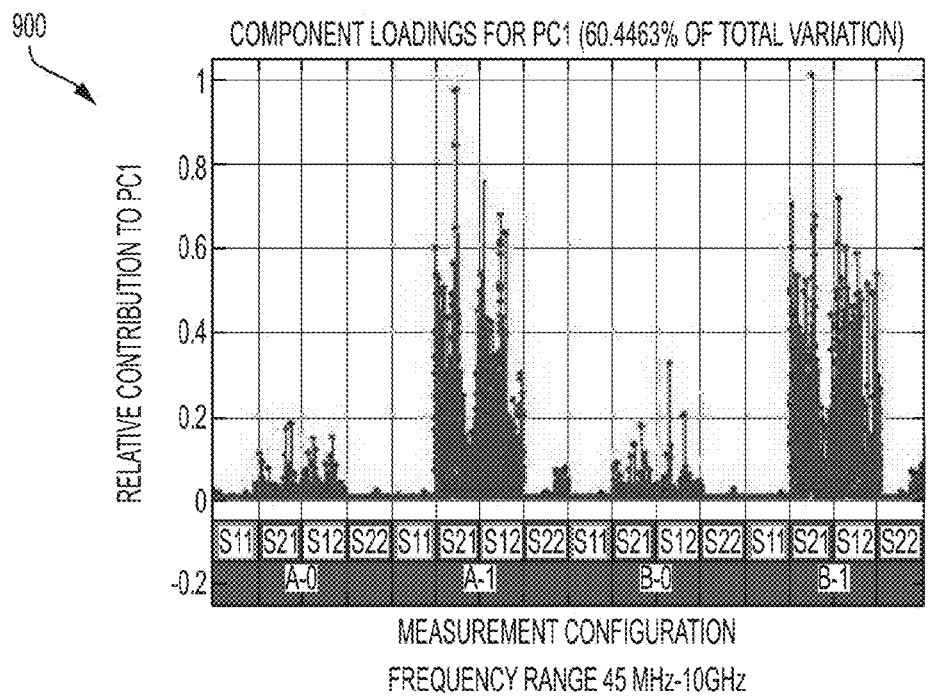
FIG. 9 illustrates a graph displaying a component loading plot for a first principal component, according to one or more embodiments shown and described herein.

Turning now to FIG. 9, a graph 900 displaying a component loading plot for a first principal component is shown according to various embodiments. In this embodiment the object port configurations which lead to the majority of the contribution to the first principal component has pin 1 in common (A-1 and B-1 configurations).

In some embodiments an input "observation matrix" data structure may be utilized to produce a clear association of measured quantities with real-space circuit locations and (by way of non-limiting example) resonant frequencies, which may include a straightforward physical link between the raw data collected and the processed output. In some embodiments this may be utilized to demonstrate not only a difference between two signatures, but also one or more physical aspects of the object that are different. In this embodiment PCA may be utilized to determine which variables in an observation matrix contributed most to a certain principal component. Continuing with this embodiment, the principal components may be ordered by their relative weight in variance, such that the first principal component contains the most variability of the original dataset. In this embodiment the loading matrix is the set of eigenvectors which project the observation variables into principal components. The relative magnitude of the eigenvector values may provide a qualitative estimate of how much a particular principal component is dominated by a particular variable. This can be followed further along, for example, by analyzing the loading matrix of each principal component, which may contain the relative normalized contribution of individual variables for that principal component. Using this information, as well as the fact that our input data is structured in an easily interpretable way (by way of non-limiting example, frequency dependent magnitude and phase, in repeating pin configurations), the physical interpretation may be determined, as depicted in FIG. 9.

Figure 10:
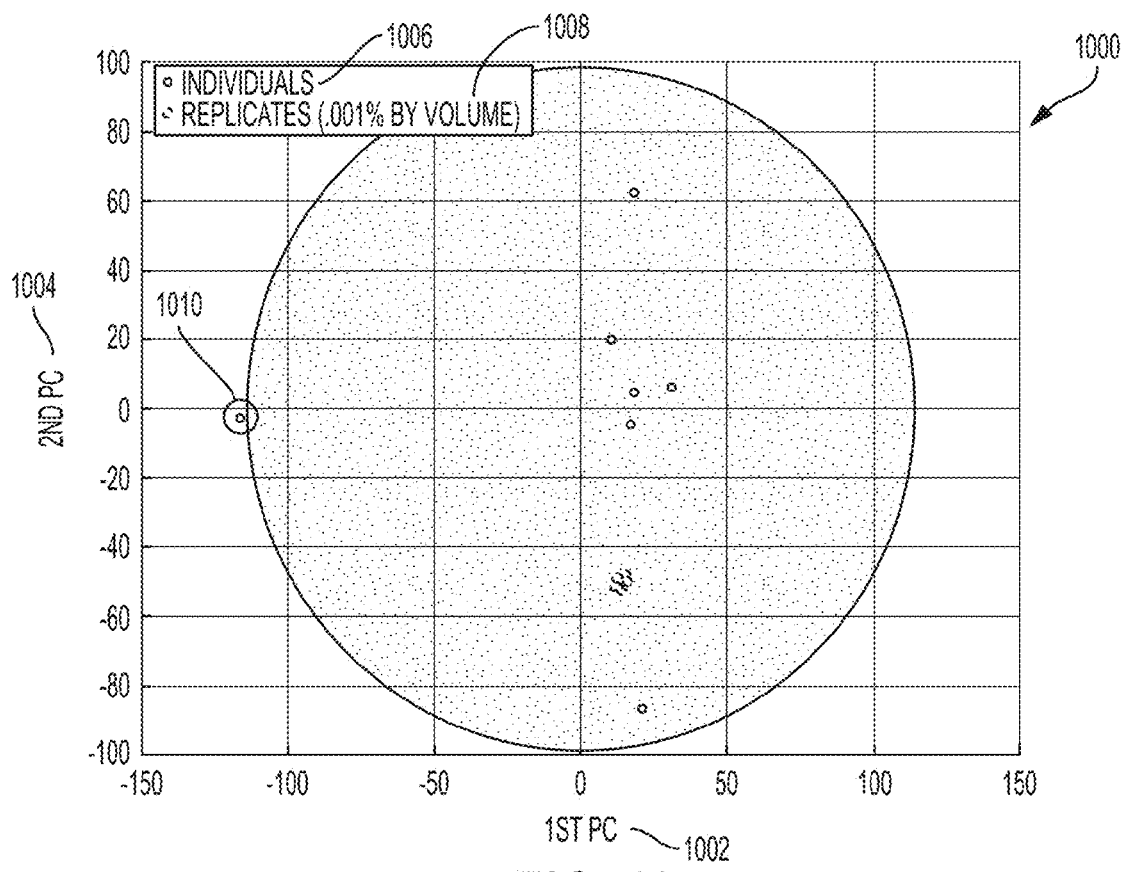
FIG. 10 illustrates a graph displaying the first two principal components as shown by the projection of cluster bounds as described by an inertia ellipsoid, according to one or more embodiments shown and described herein.

Turning now to FIG. 10, a graph 1000 displaying the first two principal components of PCA decomposition as shown by the projection of cluster bounds as described by an inertia ellipsoid is shown according to various embodiments. In this embodiment the first principal component 1002 and the second principal component 1004 of the inertial ellipsoidal plot of VCO boards may be utilized to visualize board number 3 as an outlier 1010 in the first principal component based upon the individual measurements 1006 and the replicate measurements 1008. Specifically, the x-axis may align with the structure of our input data matrix, which progresses from 45 MHz to 10 GHz, collecting $S_{11}$, $S_{21}$, $S_{12}$, and $S_{22}$ in order, for each of the progressive port configurations from A-0 to B-1 (for example four port voltage-controlled oscillator (VCO) boards). In some embodiments VCO boards may not have the same pinout as other collected data. A plot of the X-Z orientation of the inertial ellipsoid for an exemplary VCO board three is depicted in FIG. 10, such that, in this example, board three may be considered an outlier compared to the rest of the boards. Upon further inspection continuing with this example, the RF connector at port 1 is damaged, accounting for the majority of the variance. By way of non-limiting example this may also be observed in the loading plot depicted in FIG. 9, as measurement configurations with port one in common are responsible for the choice of principal component basis. The principal component basis may be utilized to minimize the mean square error of approximating the data.

Figure 11A:
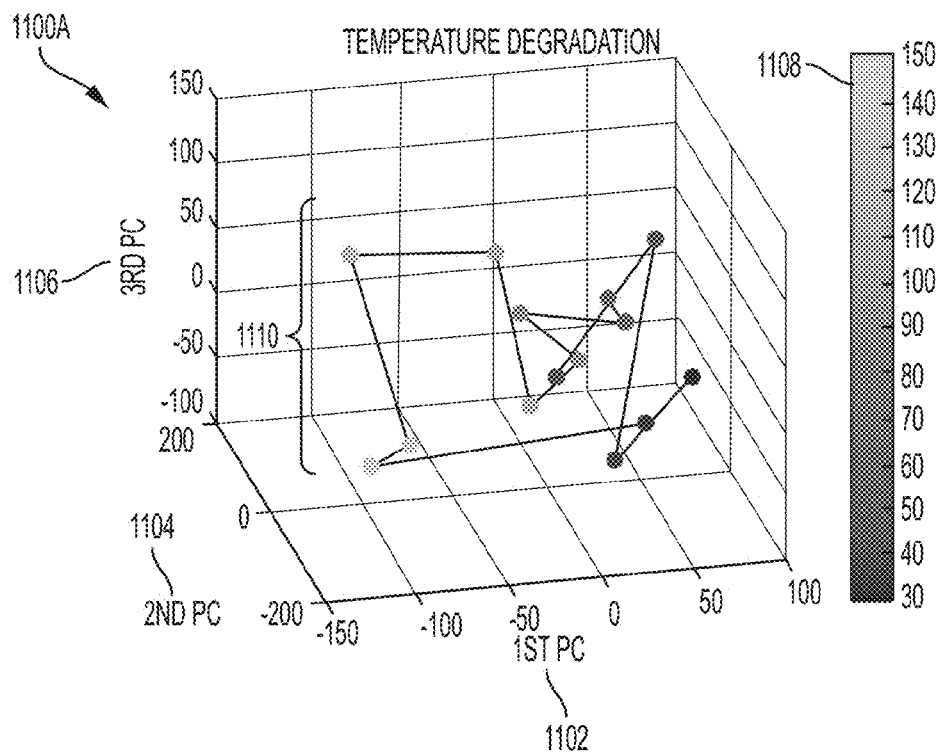
FIG. 11A illustrates a three dimensional graph displaying temperature degradation data for a dual 2-input NAND buffer/driver, according to one or more embodiments shown and described herein.

Turning now to FIG. 11A, a three dimensional graph 1100A depicting temperature degradation data for a dual 2-input NAND buffer/driver is shown according to various embodiments. In this embodiment a first principal component 1102, a second principal component 1104, and a third principal component 1106 are utilized in conjunction with a temperature range 1108 to produce temperature data points 1110.

Figure 11B:
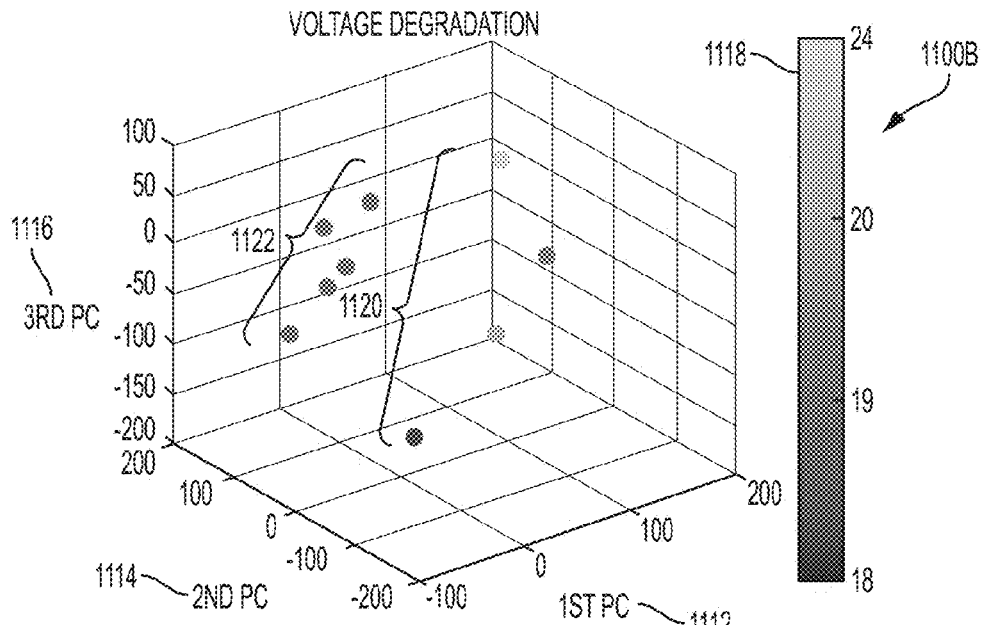
FIG. 11B illustrates a three dimensional graph displaying voltage degradation data for a dual 2-input NAND buffer/driver, according to one or more embodiments shown and described herein.

Turning now to FIG. 11B, a three dimensional graph 1100B for displaying voltage degradation data for a dual 2-input NAND buffer/driver is shown according to various embodiments. In this embodiment a first principal component 1112, a second principal component 1114, and a third principal component 1116 are utilized in conjunction with a voltage degradation range 1118 to produce voltage degradation data points 1120.

Figure 12A:
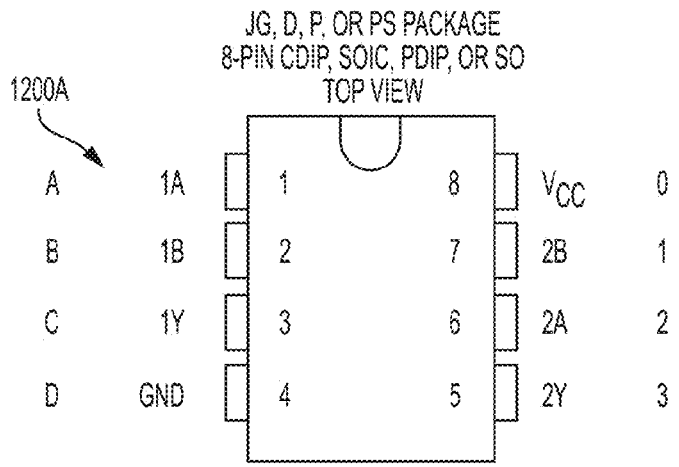
FIG. 12A schematically illustrates a multi-pin chip, according to one or more embodiments shown and described herein.

Turning now to FIG. 12A, a schematic illustration 1200A depicting a multi-pin chip is shown according to various embodiments.

Figure 12B:
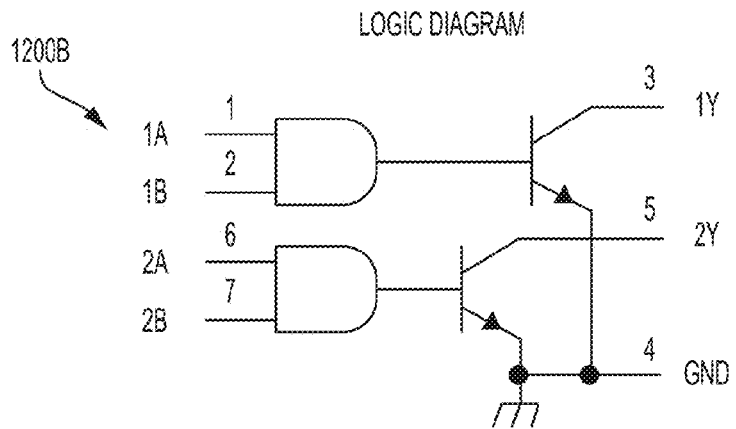
FIG. 12B schematically illustrates a logic diagram of the multi-pin chip, according to one or more embodiments shown and described herein.

Turning now to FIG. 12B, a schematic illustration 1200B depicting a logic diagram of the multi-pin chip is shown according to various embodiments.

Figure 12C:
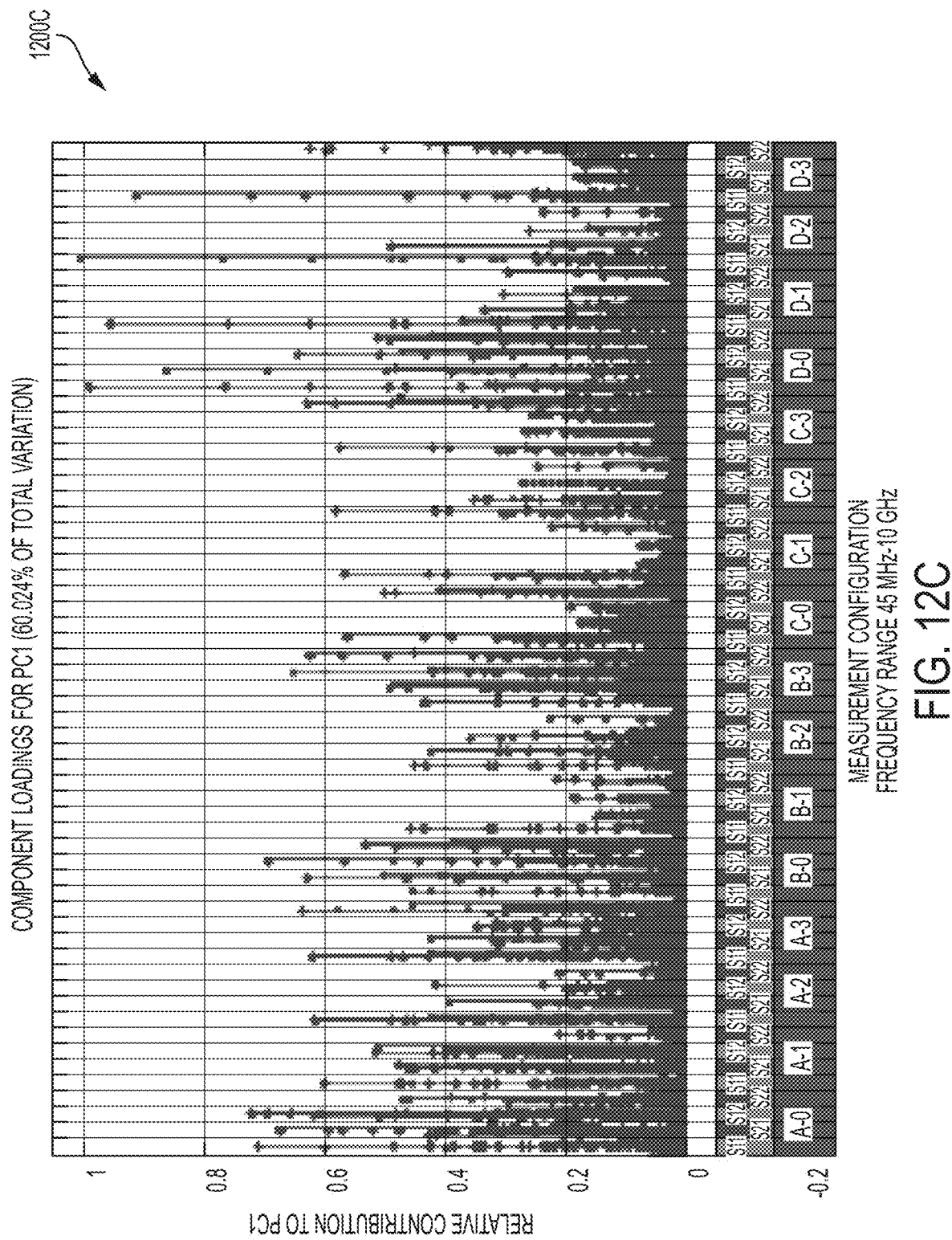
FIG. 12C illustrates a graph displaying the relative contributions of measurements of the multi-pin chip to a principal component, according to one or more embodiments shown and described herein.

Turning now to FIG. 12C, a graph 1200C displaying the relative contributions of measurements of the multi-pin chip to principal component 1 is shown according to various embodiments.

Figure 12D:
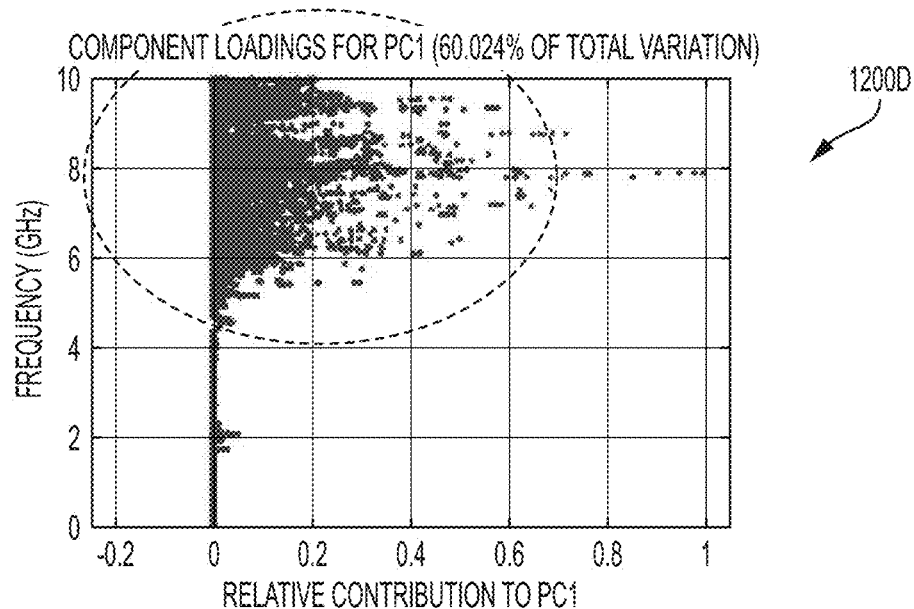
FIG. 12D illustrates a graph displaying the component loading plot for the multi-pin chip, according to one or more embodiments shown and described herein.

Turning now to FIG. 12D, a graph 1200D displaying the frequency spectrum for the multi-pin chip is shown according to various embodiments. In this embodiment a clear observation is provided as to what frequencies are important for date code distinction. In other embodiments these frequencies may not be the most significant for another set of chips.

Figure 13A:
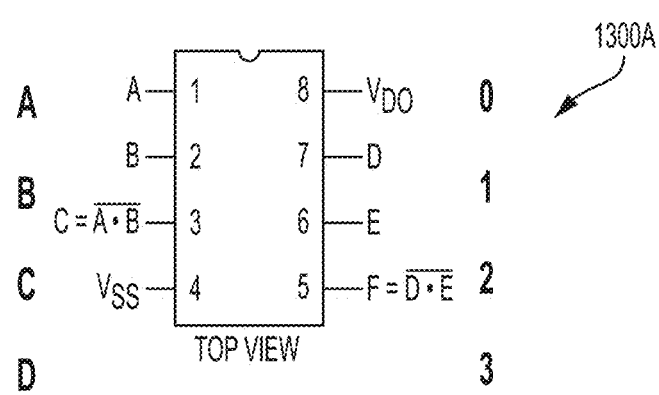
FIG. 13A schematically illustrates a diagram of an integrated circuit, according to one or more embodiments shown and described herein.

Turning now to FIG. 13A, a schematic diagram 1300A of an integrated circuit is shown according to various embodiments.

Figure 13B:
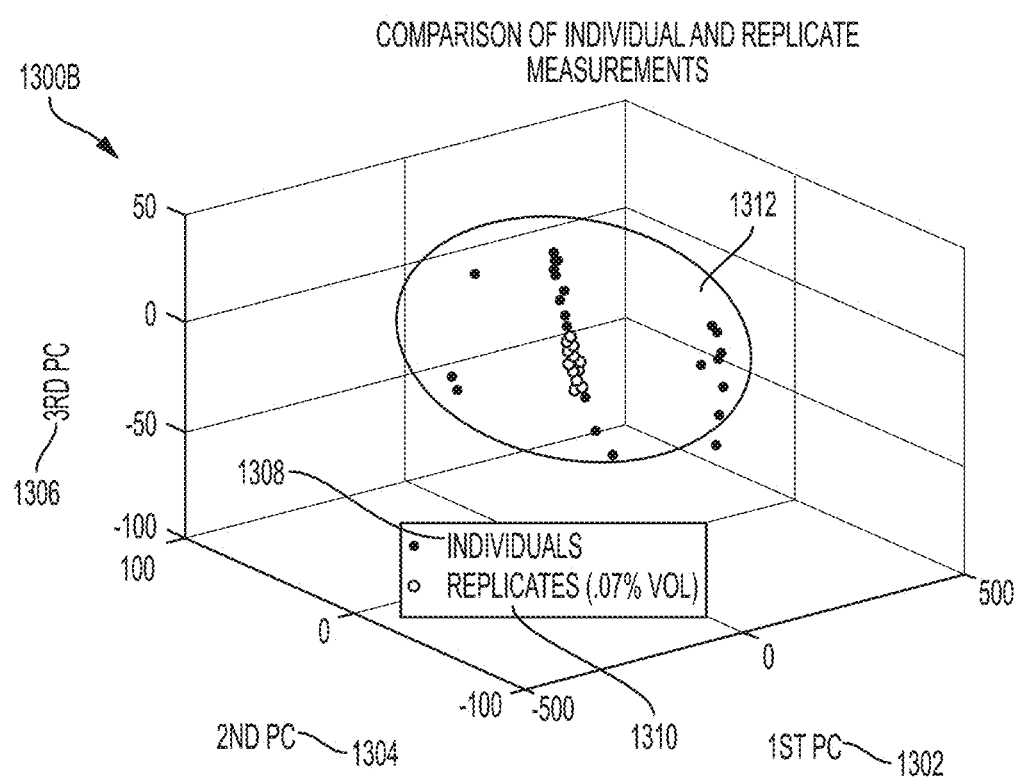
FIG. 13B illustrates a three dimensional graph displaying a principal component analysis of individual and replicate measurements, according to one or more embodiments shown and described herein.

Turning now to FIG. 13B, a three dimensional graph 1300B displaying a principal component analysis of individual and replicate measurements is shown according to various embodiments.

In this embodiment a physical interpretation using loading analysis may utilize PCA with a first principal component 1302, a second principal component 1304, and a third principal component 1306. For example, in analyzing variation between replicates, loading information may be used to determine what port configurations contribute to physical measurement uncertainty when applied to measurements of replicate measurement data points 1310. In this embodiment, component loading may allow for understanding of dominant sources of measurement uncertainty among individual measurement data points 1308 and which may lead to the formation of one or more clusters 1312. Continuing with this example, a dataset of 50 replicate measurements of a single individual object is depicted in FIGS. 13B-F.

Figure 13C:
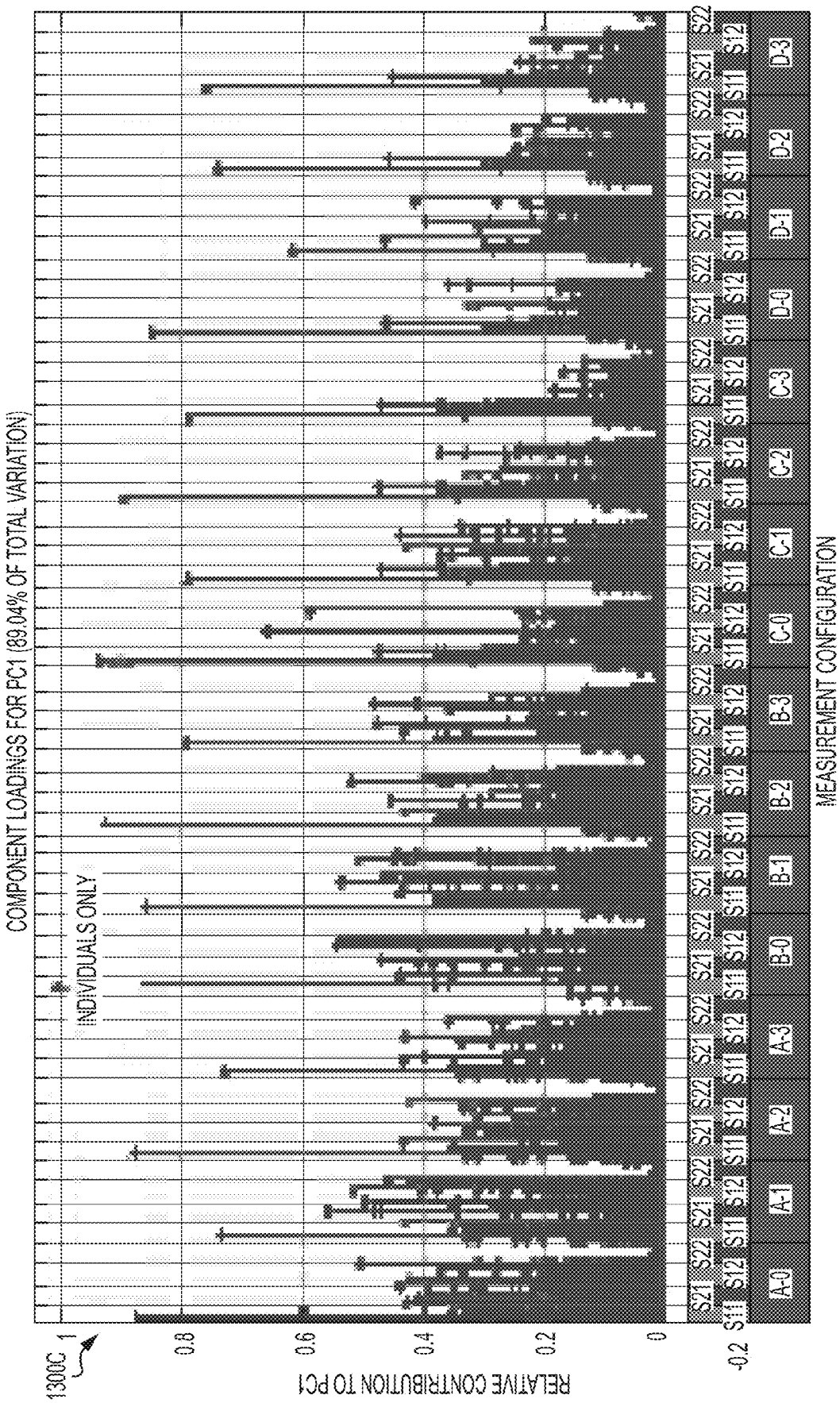
FIG. 13C illustrates a graph displaying the relative contribution of original measurements to a principal component, according to one or more embodiments shown and described herein.

Turning now to FIG. 13C, a graph 1300C displaying the relative contribution of original measurements to principal component 1 is shown according to various embodiments.

Figure 13D:
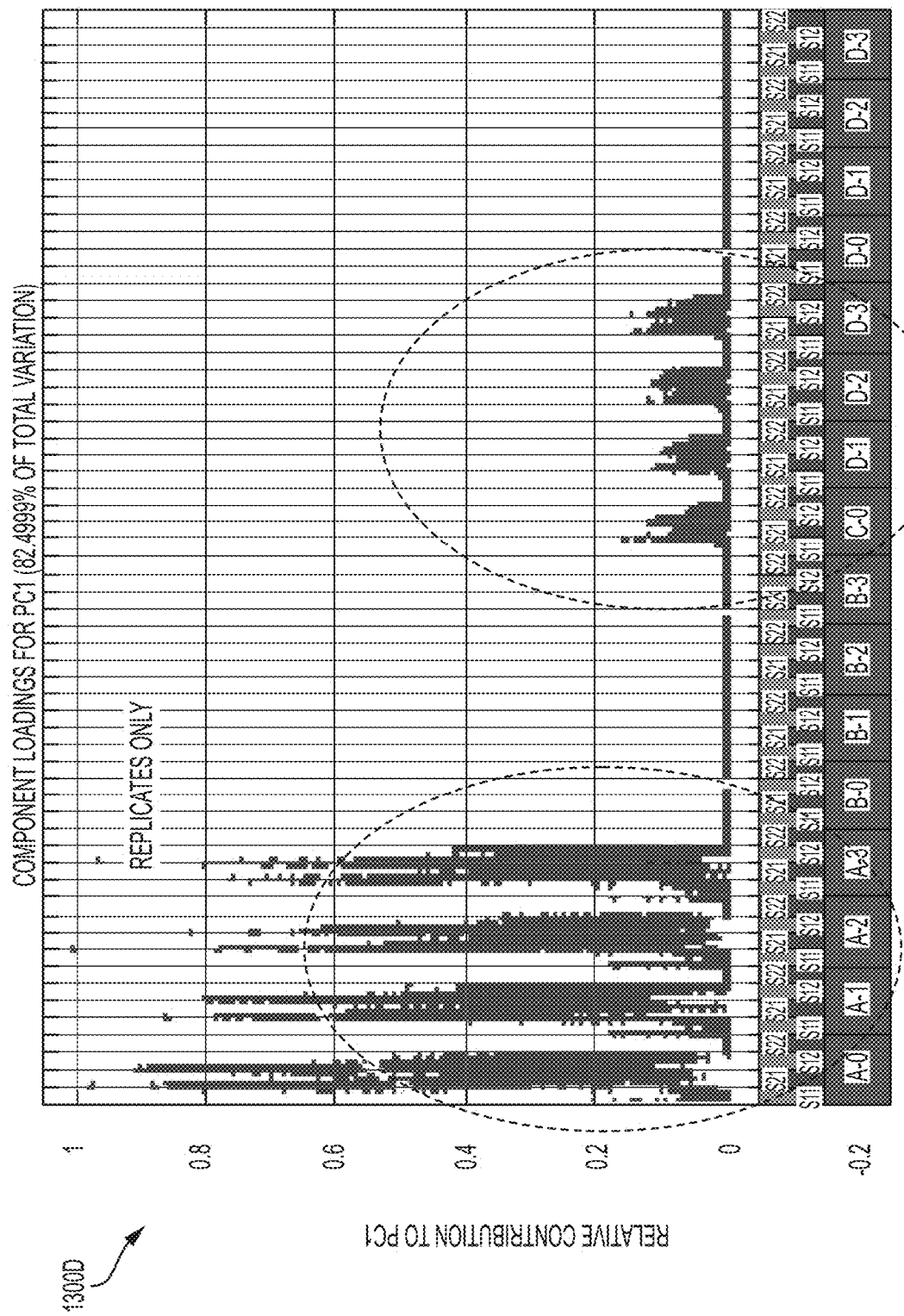
FIG. 13D illustrates a graph displaying the relative contribution of port and measurement configuration to a principal component, according to one or more embodiments shown and described herein.
Figure 13E:
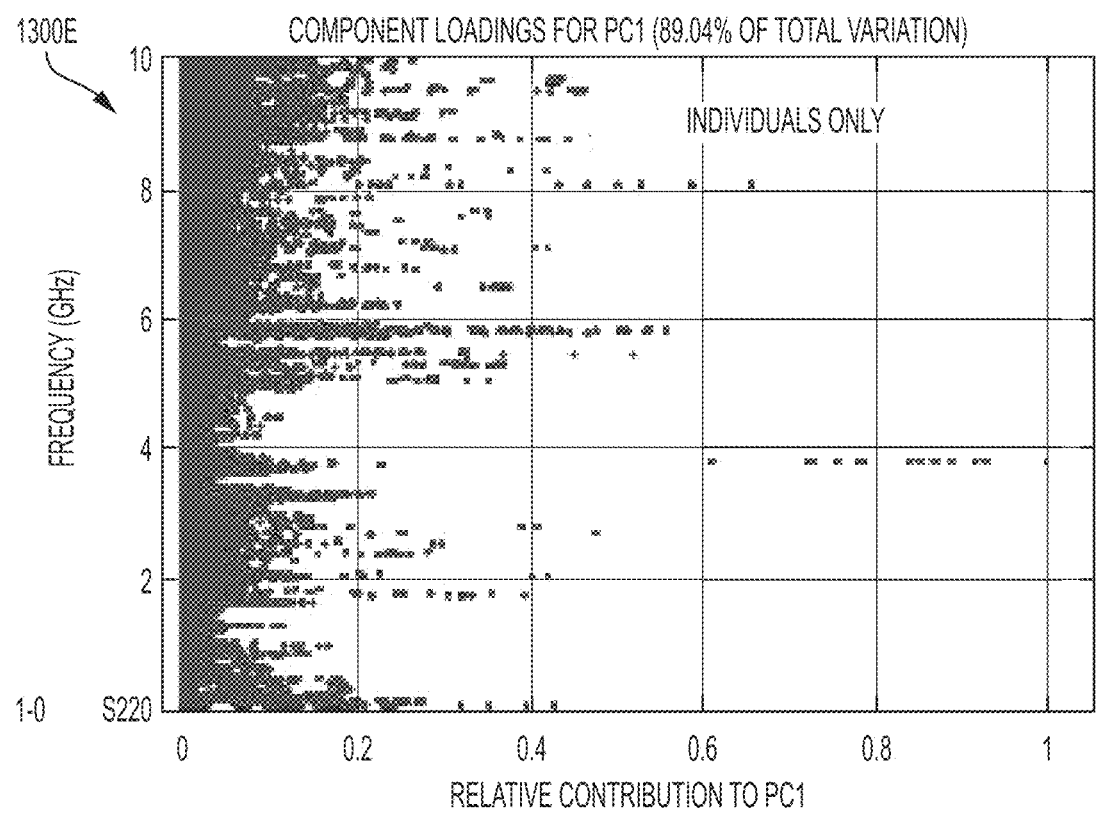
FIG. 13E illustrates a graph displaying the relative contribution of frequency of original measurements, according to one or more embodiments shown and described herein.

Turning now to FIG. 13D, a graph 1300D displaying the relative contribution of port and measurement configuration to principal component 1 is shown according to various embodiments. port and measurement configuration Turning now to FIG. 13E, a graph 1300E displaying the frequency of original measurements is shown according to various embodiments. In some embodiments the data which comes out of the VNA may be seen in FIGS. 4A-B.

Figure 13F:
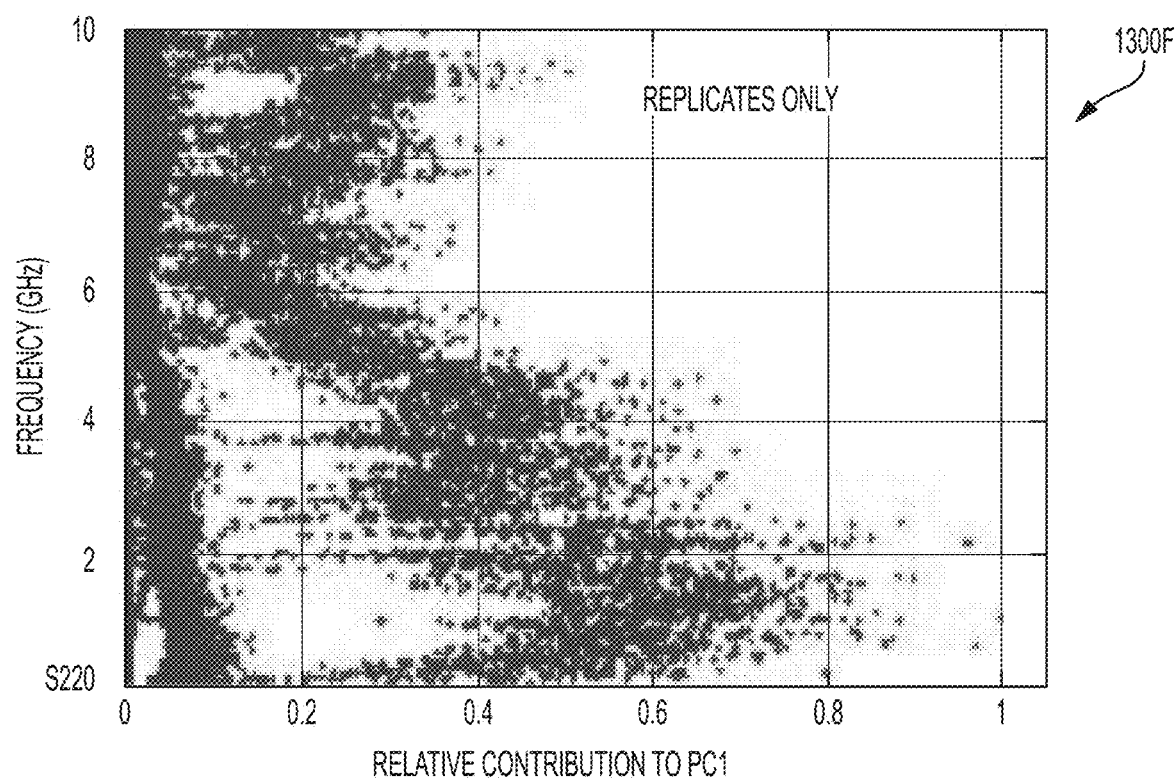
FIG. 13F illustrates a graph displaying the frequency of replicant measurements, according to one or more embodiments shown and described herein.

Turning now to FIG. 13F, a graph 1300F displaying the frequency of replicate measurements is shown according to various embodiments.

Figures 14A, 14B, 14C:
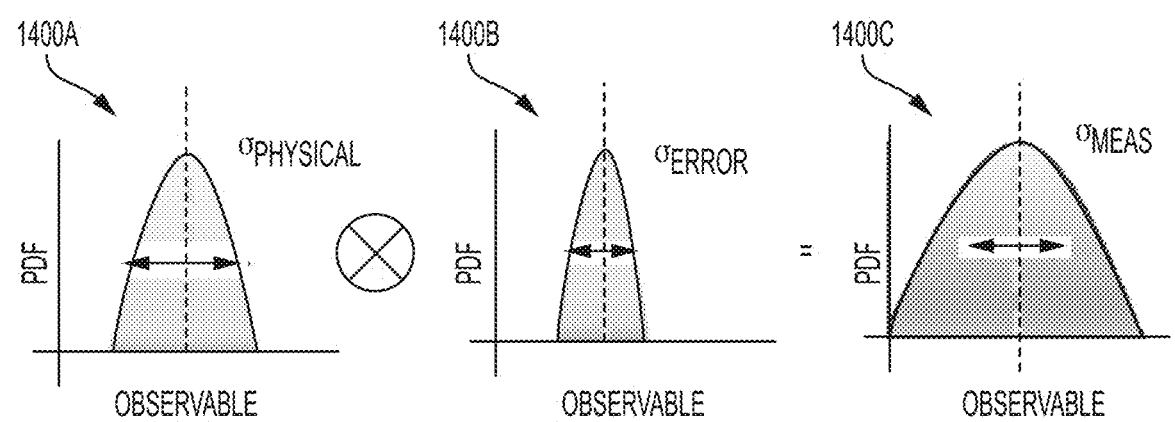
FIG. 14A illustrates a graph of a real device variation function, according to one or more embodiments shown and described herein.
FIG. 14B illustrates a graph of a measurement uncertainty function, according to one or more embodiments shown and described herein.
FIG. 14C illustrates a graph of a measured probability density function, according to one or more embodiments shown and described herein.

Turning now to FIG. 14A, an illustrated graph 1400A depicting a real device variation function is shown according to various embodiments.

Turning now to FIG. 14B, a graph 1400B depicting a measurement uncertainty function is shown according to various embodiments.

Turning now to FIG. 14C, a graph 1400C depicting a measured and/or calculated probability density function (PDF) is shown according to various embodiments.

Figure 15:
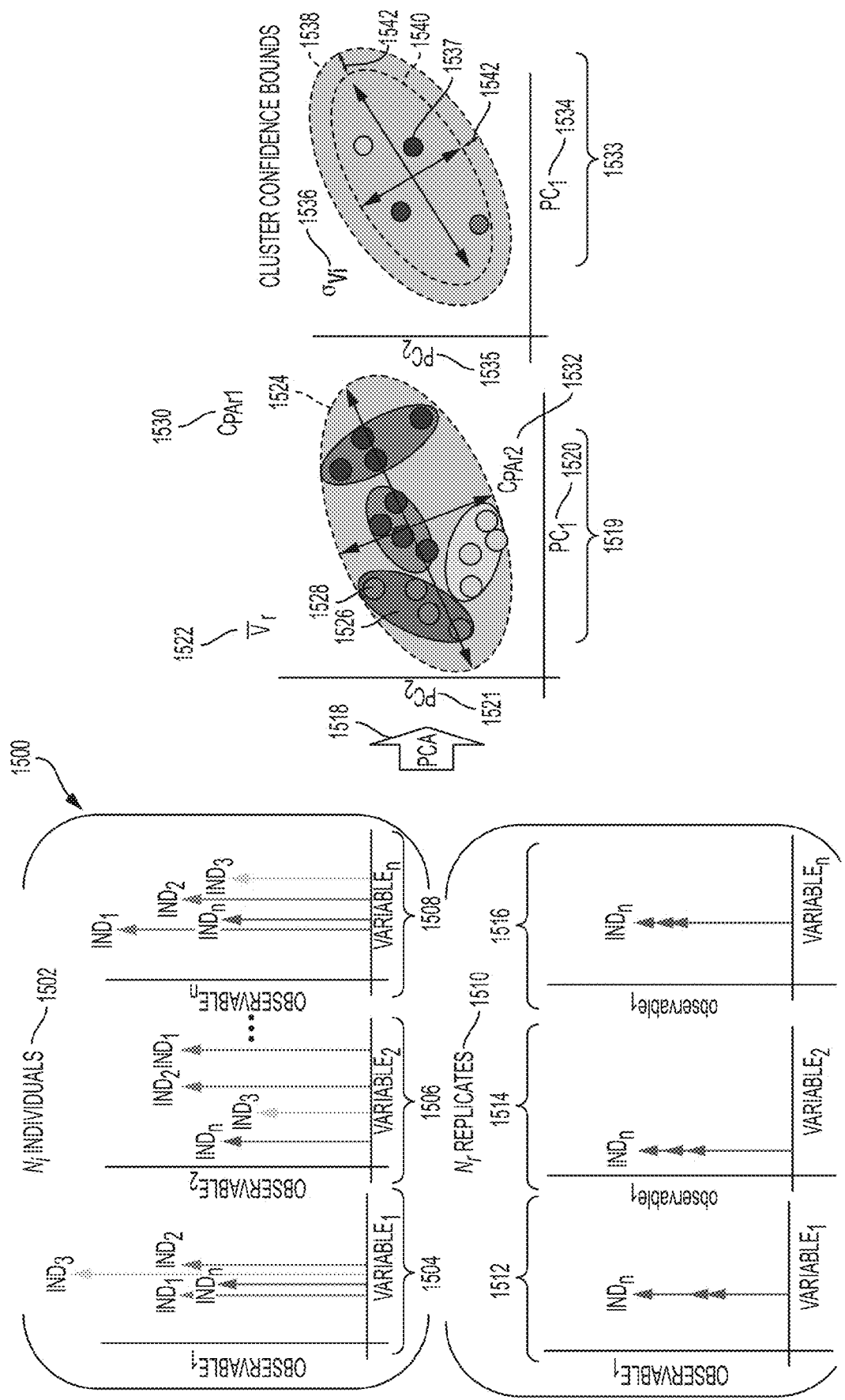
FIG. 15 illustrates the application of principal component analysis and Monte Carlo probability density function estimation to obtain cluster confidence bounds, according to one or more embodiments shown and described herein.

Turning now to FIG. 15, a schematic illustration 1500 depicting the application of principal component analysis and Monte Carlo probability density function estimation to obtain cluster confidence bounds is shown according to various embodiments. In this embodiment, measurement uncertainty estimation may be established utilizing quantifiable methods for assessment of measurement systems fidelity, providing a straightforward empirical approach which may be utilized to provide a comparison of measurement fidelity across all available techniques which use cluster comparison metrics. For individual object measurements 1502, a first individual measurements graph 1504, second individual measurements graph 1506, and an nth individual measurements graph 1508 (for example) may be utilized for any number of variables that may be contents of a matrix, such as the Sij(f) matrix discussed above. For replicate measurements 1510, a first replicate measurements graph 1512, a second replicate measurements graph 1514, and an nth replicate measurements graph 1516 (for example) may be utilized for any number of variables that may be contents of a matrix, such as the Sij(f) matrix discussed above. PCA 1518 may be utilized to generate a cluster graph 1519 according to (for example) a first principal component 1520 and a second principal component 1522 (any suitable number of principal components may be utilized) such that a cluster confidence bound 1524 may be formed around any number of clusters 1526 comprising data points 1528. In some embodiments a suitable PDF such as Monte Carlo PDF estimation may be applied to generate a cluster confidence bounds graph 1530 in terms of $\sigma_{vi}$ the standard deviation in the volume of the ellipsoid for each Monte Carlo iteration 1536. The cluster confidence bounds graph 1530 may pertain to a first principal component 1532 and a second principal component 1534 (any suitable number of principal components may be utilized). For data points 1537 a first cluster confidence bound 1538 and a second cluster confidence bound 1540 may be generated, where a cluster confidence difference 1542 is the difference between them. For example, a measured PDF may be described as a convolution of measurement uncertainty and real device variation, which in this embodiment are decoupled to provide an accurate measurement, which may thus provide for rigorous separation of measurement uncertainty from signature data.

Figure 16A:
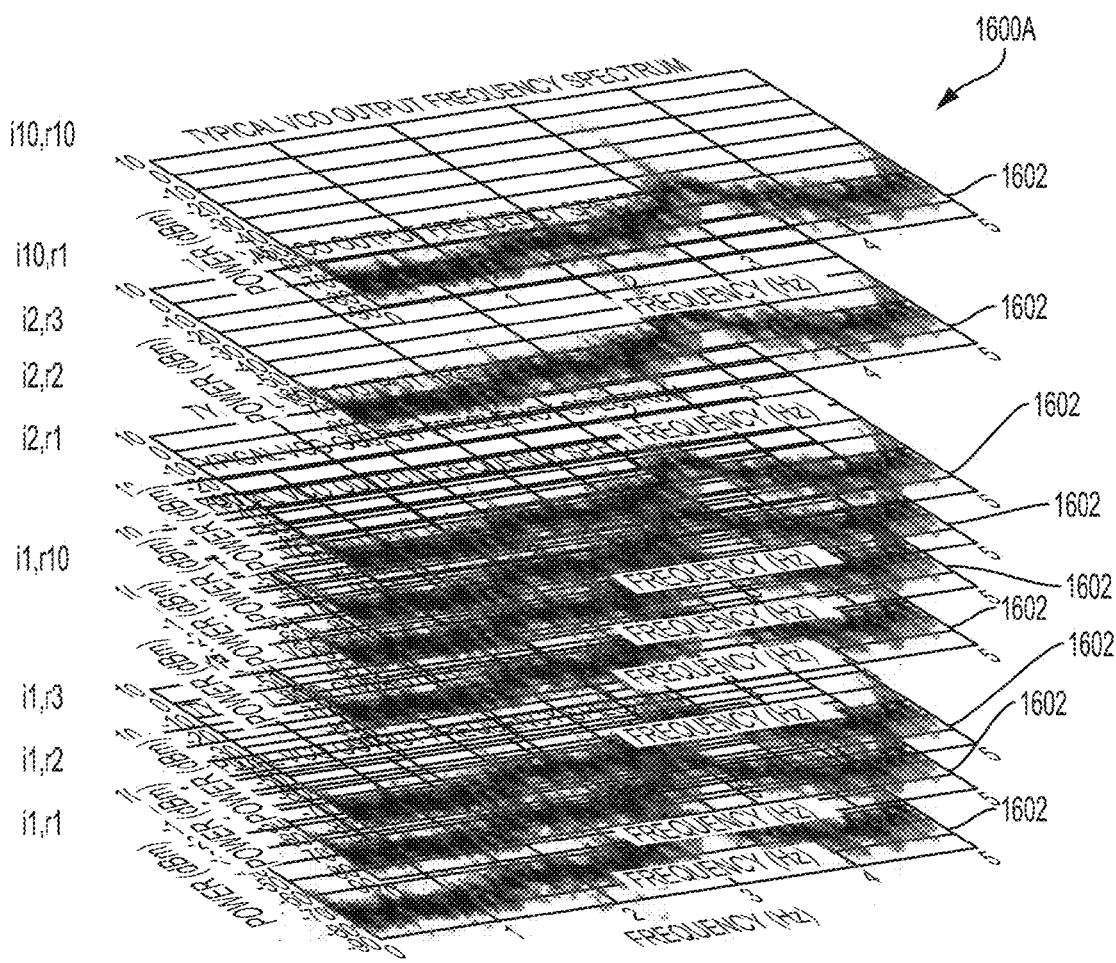
FIG. 16A illustrates the display of full spectral data for an observation matrix of multiple output frequency spectrum graphs, according to one or more embodiments shown and described herein.

Turning now to FIG. 16A, a schematic illustration 1600A for displaying full spectral data for an observation matrix of multiple output frequency spectrum graphs is shown according to various embodiments. In this embodiment, raw data is depicted in the form of which it is processed, which includes here, for example, output frequency spectrum graphs (typical VCO output frequency spectrum in this example), each measuring power (dBm) in terms of frequency (Hz) within an observation matrix 1602 for 10 individual objects i (i1 . . . i10) and 10 replicate objects r (r1 . . . r10).

Figure 16B:
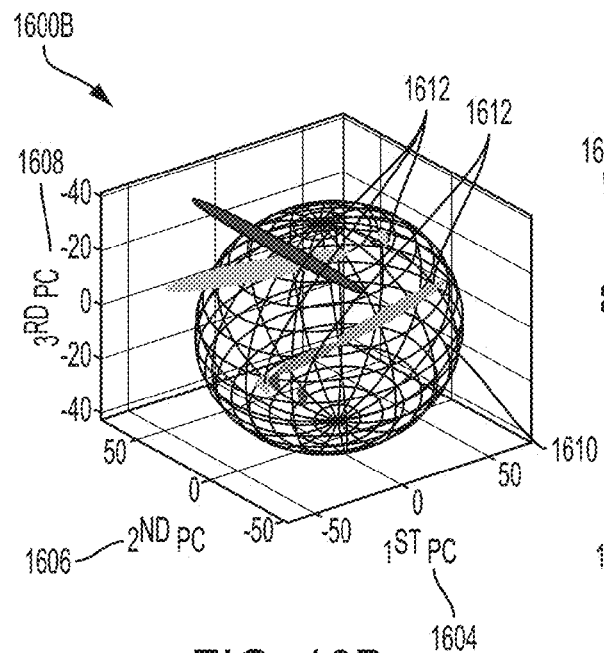
FIG. 16B illustrates a three dimensional graph displaying a principal component analysis cluster obtained by principal component analysis applied to the observation matrix with replicate and total ellipsoids being calculated, according to one or more embodiments shown and described herein.

Turning now to FIG. 16B, PCA of full spectral data is depicted in a three dimensional graph 1600B displaying a PCA cluster obtained by PCA applied to the observation matrix with replicate and total ellipsoids being calculated is shown according to various embodiments, utilizing a first principal component 1604, a second principal component 1606, and a third principal component 1608. Transformation of individual-replicate dataset may yield a total in-family cluster as well as 10 subclusters of replicates corresponding to output frequency spectrum graphs observation matrix 1602 in FIG. 16A. In this embodiment a PCA cluster (first 3 PCs) with replicate and total ellipsoids (ellipsoids calculated from all subclusters of replicates) 1610 calculated is depicted in FIG. 16B. In this embodiment, for an acceptable signal-to-noise measure, subcluster or cluster volume 1612 should be less than the total family volume.

Figure 16C:
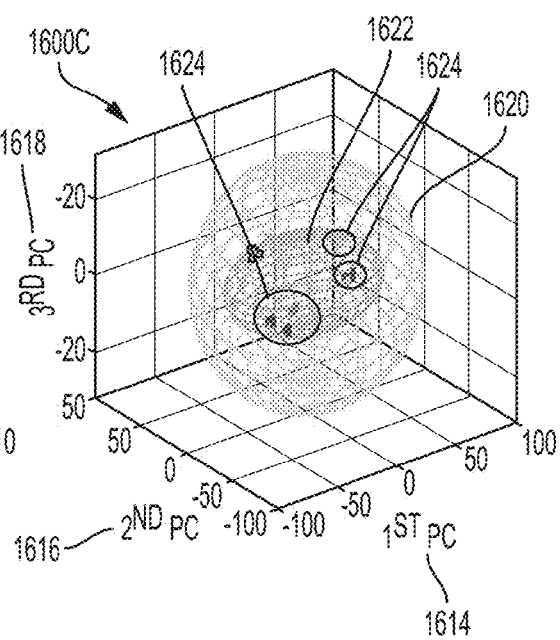
FIG. 16C illustrates a three dimensional graph displaying Monte Carlo probability density function estimation to obtain cluster confidence bounds, according to one or more embodiments shown and described herein.

Turning now to FIG. 16C, PCA of full spectral data is depicted in a three dimensional graph 1600C displaying Monte Carlo probability density function estimation to obtain cluster confidence bounds is shown according to various embodiments. In this embodiment, variation signatures are a statistical quantity and are accompanied with an uncertainty and confidence interval for meaningful interpretation. PCA may utilize a first principal component 1614, a second principal component 1616, and a third principal component 1618. By way of non-limiting example, empirical PDF estimation and/or post-PCA transform may allow for confidence interval specification in some embodiments, thus resulting in a total ellipsoid plus three standard deviations 1620 and a total ellipsoid (ellipsoid calculated from all subclusters of replicates) 1622 containing clusters 1624. Other examples may utilize any suitable number of standard deviations 1620. Also by way of non-limiting example, unique object signatures from a plurality of objects may be stored in a dataset, principal component analysis may be performed on the unique signatures stored in the dataset, and a probability density function and a transform may be utilized after the PCA to determine a confidence interval specification.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for measuring unique microelectronic electromagnetic signatures comprising:
directly injecting a nondestructive signal as input into a port of an object in a powered-off state;

receiving as output from a signal path within the object a unique frequency dependent complex spectrum comprising a reflection spectrum or a transmission spectrum;

generating a unique object signature based upon the port and the received spectrum;

storing unique object signatures from a plurality of objects in a dataset;

performing principal component analysis on the unique signatures stored in the dataset;

utilizing a probability density function and a transform after the principal component analysis to determine a confidence interval specification; and differentiating the object from a different object based upon a comparison of the unique object signature of each.

2. The computer-implemented method of claim 1 further comprising a vector network analyzer.

3. The computer-implemented method of claim 1 further comprising a plurality of vector network analyzers each having a phaselocked multiport configuration sharing a common local oscillator signal.

4. The computer-implemented method of claim 1 wherein the object comprises:
a plurality of ports; and
a switch matrix corresponding to each port of the object.

5. The computer-implemented method of claim 1 wherein the nondestructive signal is less than 1 milliwatt.

6. The computer-implemented method of claim 1 wherein the nondestructive signal is applied to a pin of an integrated circuit.

7. The computer-implemented method of claim 1, wherein:
a plurality of objects are tested to generate a unique object signature for each object; and
each test of each object in the plurality of objects is completed in less than 4 seconds.

8. The computer-implemented method of claim 1 further comprising performing, based upon unique object signatures, differentiation between objects on the basis of manufacturer, date code, usage wear, wafer, packing house, fabrication location, age, environmental effects, or manufacturer effects.

9. A system for measuring unique microelectronic electromagnetic signatures comprising:
a measurement component configured to:
inject a nondestructive signal as input into a port of an object; and
receive as output from a signal path within the object a unique frequency dependent complex spectrum comprising a reflection spectrum or a transmission spectrum; and
an analysis component configured to:
generate a unique object signature based upon the port and the received spectrum;
store unique object signatures from a plurality of objects in a dataset;
perform principal component analysis on the unique signatures stored in the dataset;
utilize a probability density function and a transform after the principal component analysis to determine a confidence interval specification; and
differentiate the object from a different object based upon a comparison of the unique object signature of each.

10. The system of claim 9 wherein the measurement component comprises a vector network analyzer.

11. The system of claim 9 wherein the measurement component comprises a plurality of vector network analyzers each having a phaselocked multiport configuration sharing a common local oscillator signal.

12. The system of claim 9 wherein:
the object comprises a plurality of ports; and
the measurement component comprises a switch matrix at each port.

13. The system of claim 9 wherein the nondestructive signal is less than 1 milliwatt.

14. The system of claim 9 wherein the nondestructive signal is applied to a pin of an integrated circuit.

15. The system of claim 9 wherein:
the object is in a powered-off state during injection of the nondestructive signal; and
the nondestructive signal is directly injected into the port of the object.

16. The system of claim 9 wherein the system is further configured to:
test a plurality of objects to generate a unique object signature for each object; and
complete each test of each of the plurality of objects in under 4 seconds.

17. The system of claim 9 wherein the system is further configured to perform, based upon unique object signatures, differentiation between objects on the basis of manufacturer, date code, usage wear, wafer, packing house, fabrication location, age, environmental effects, or manufacturer effects.

18. The system of claim 9 wherein the measurement component is further configured to generate principal components ordered by their relative weight in variance, such that the first principal component contains the most variability of the original dataset.

19. The system of claim 18 wherein the measurement component is further configured to:
generate a loading matrix as a set of eigenvectors which project the observation variables into principal components, wherein the relative magnitude of the eigenvector values provide a qualitative estimate of how much a particular principal component is dominated by a particular variable; and
analyze a loading matrix of each principal component, which contains the relative normalized contribution of individual variables for that principal component.

* * * * *